United States Patent
Chamas et al.

(10) Patent No.: US 6,650,974 B2
(45) Date of Patent: Nov. 18, 2003

(54) METHODS AND APPARATUS FOR AUTOMATED FLIGHT PREPARATION

(75) Inventors: Bassam H. Chamas, Redondo Beach, CA (US); Ryuichi Yokota, Rolling Hills Estates, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 48 days.

(21) Appl. No.: 09/986,433

(22) Filed: Nov. 8, 2001

(65) Prior Publication Data

US 2002/0055816 A1 May 9, 2002

Related U.S. Application Data

(60) Provisional application No. 60/246,608, filed on Nov. 8, 2000.

(51) Int. Cl.[7] .............................................. G06F 19/00
(52) U.S. Cl. ............................ 701/5; 701/14; 701/124
(58) Field of Search ............................ 701/3, 5, 14, 15, 701/124; 340/959, 973, 945; 73/178 T

(56) References Cited

U.S. PATENT DOCUMENTS

| | | | |
|---|---|---|---|
| 3,701,279 A | * 10/1972 | Harris et al. | 73/65.06 |
| 3,746,844 A | 7/1973 | Azum et al. | 235/150.2 |
| 4,831,538 A | * 5/1989 | Cucchiari et al. | 701/200 |
| 4,980,833 A | * 12/1990 | Milligan et al. | 701/15 |
| 5,202,690 A | 4/1993 | Frederick | |
| 5,331,330 A | 7/1994 | Susnjara | |
| 5,521,827 A | * 5/1996 | Lindberg et al. | 701/124 |
| 5,548,517 A | * 8/1996 | Nance | 701/124 |
| 6,094,608 A | * 7/2000 | Bomans et al. | 701/14 |
| 6,128,951 A | * 10/2000 | Nance | 73/178 T |
| 6,317,659 B1 | * 11/2001 | Lindsley et al. | 701/1 |

FOREIGN PATENT DOCUMENTS

| | | |
|---|---|---|
| EP | 0 381 164 A2 | 8/1990 |
| WO | WO85/01372 * | 3/1985 |
| WO | WO93/16359 * | 8/1993 |

OTHER PUBLICATIONS

"Do–it–yourself weighing machine approved," Flight International, Reed Business Information, Haywards Heath, GB, vol. 154, No. 4632, p. 30 (Jul. 1, 1998).

Payne B., "Aircraft Weighing," Measurement and Control, Institute of Measurement and Control, London, GB, vol. 24, No. 4, pps. 102–104 (May 1, 1991).

Federal Aviation Regulations/Aeronautical Informational Manual (FAR/AIM 2002), U.S. Dept. of Transportation.

* cited by examiner

*Primary Examiner*—Michael J. Zanelli
(74) *Attorney, Agent, or Firm*—Finnegan, Henderson, Farabow, Garrett & Dunner, L.L.P.

(57) ABSTRACT

Methods and apparatus are provided for automated flight preparation. Methods and apparatus may be used to automatically determine gross weight, weight and balance, take-off distance, rate-of-climb, and flight dynamics, such as fuel, time and distance for an aircraft. In addition, information such as airspeed system calibration, and power-off stall speed in angle of bank may be calculated.

15 Claims, 24 Drawing Sheets

\* - Depends Upon Outside Air Temperature

| | Weight | ARM AFT Datum | Moment |
|---|---|---|---|
| Empty Arc | $\underline{A}$ | $\underline{B}$ | $\underline{A \times B}$ |
| Crew | D | $\underline{E}$ | $D \times E$ |
| Row₁ | F | $\underline{G}$ | $F \times G$ |
| ⋮ | | | |
| Rowₙ | K | $\underline{L}$ | $K \times L$ |
| Baggage | M | $\underline{N}$ | $M \times N$ |
| Fuel | P | $\underline{R}$ | $P \times R$ |
| Totals | $T_1$ | $M_1/T_1$ | $M_1$ |

\* Underlined is Known or Predetermined Factor

Fig. 8

| | 130 Weight A | 132 ARM AFT Datum B | 134 Moment A X B | 135 |
|---|---|---|---|---|
| 114 Empty Arc | A | B | A X B | |
| 116 Crew | D | E | D X E | |
| 118 Row₁ | F | G | F X G | |
| ... | | | | |
| 118ₙ Rowₙ | K | L | K X L | |
| 120 Baggage | M | N | M X N | |
| 122 Fuel | P | R | P X R | |
| 124 Total Gross Weight | T | W/T | M1 | |
| 126 Consumed Fuel at End of Flight | Y | R | Y X R | |
| 128 Totals at Destination | T-Y | M₂/T-Y | M₂=M₁-YXR | |

Fig. 10

METHODS AND APPARATUS FOR AUTOMATED FLIGHT PREPARATION

REFERENCE TO RELATED APPLICATIONS

This application claims the benefit of priority from co-pending prior provisional application Serial No. 60/246,608, filed Nov. 8, 2000 for "METHODS AND APPARATUS FOR AUTOMATED FLIGHT PREPARATION," which is incorporated herein by reference.

FIELD OF THE INVENTION

This invention relates generally to flight preparation for piloting an aircraft. More particularly, it relates to apparatus and methods for automatic flight preparation, e.g., weight balance calculations, take-off distance, best rate-of-climb, fuel, time, distance required to climb, and other flight preparation operations.

BACKGROUND OF THE INVENTION

Thorough flight preparation by a pilot is important for flight safety. For example, an aircraft may be unable to operate safely with both a full passenger load and a full fuel load due to excessive weight and/or improper balance. Also, an accurate determination of minimum take-off distance is critical to flight preparation, especially at smaller airports.

Today, flight preparation for piloting aircraft is a manual process. Currently, a pilot refers to a pilot operating handbook (POH), typically provided for each aircraft. In addition, each aircraft is typically provided with a set of charts so that a pilot may individually calculate each parameter necessary for safe operation of the aircraft. These parameters include, for example, weight and balance, take-off distance, best rate-of-climb, fuel, time and distance required to climb, and other flight preparation parameters.

For example, a pilot will calculate gross weight and refer to an aircraft's POH and charts to calculate necessary distribution of fuel and passenger loads to ensure proper balance of an aircraft. Determination of other flight preparation parameters also requires calculation by a similar manual process of referring to the POH and charts.

Flight preparation is tedious and time consuming. For example, a full flight preparation requires simultaneous consideration of several parameters, e.g., gross weight, temperature, and simultaneous reference to several charts. Also, the manual nature of the current flight preparation process is prone to error, since simultaneous referencing of several charts is difficult.

Accordingly, many pilots do not conduct a full flight preparation. Instead, many pilot's flight preparation parameters are estimated, based upon the sample calculations provided in the POH. For example, the pilot operation manual may provide flight preparation information for two different gross weights, e.g., 24,000 lbs. and 28,000 lbs., to indicate generally the flight performance characteristics of an aircraft. A pilot will then simply estimate flight preparation by extrapolating between the calculations provided, e.g., between 24,000 lbs and 28,000 lbs. For example, if a pilot is calculating a minimum take-off distance for an estimated gross weight of 26,000 lbs., then the pilot will use the distance half way between distance calculated at 24,000 and 28,000 lbs. as part of his flight preparation.

It is accordingly desirable to allow a pilot to easily calculate a full flight preparation and increase flight safety. This is achieved by providing apparatus and methods for automatically calculating a full flight preparation.

SUMMARY OF THE INVENTION

In accordance with an embodiment of the present invention, a method of determining a balance of an aircraft comprises: receiving a plurality of factors affecting the weight of an aircraft; determining automatically a gross weight for the aircraft based on the plurality of factors; receiving a datum indicating a center of lift for the aircraft; determining a plurality of moments based on the factors and the datum; and determining at least one center of gravity based on the plurality of moments and the gross weight.

In accordance with another embodiment of the present invention, a method of determining a take-off distance for an aircraft comprises: determining automatically a gross weight for the aircraft; receiving a set of take-off distance data for the aircraft; receiving information indicating conditions affecting the take-off distance for the aircraft; and determining automatically a take-off distance for the aircraft based on the gross weight, conditions affecting take-off distance, and the set of take-off distance data.

In accordance with another embodiment of the present invention, a method of determining a rate of climb for an aircraft comprises: determining automatically a gross weight for the aircraft; receiving a set of data indicating a rate-of-climb for the aircraft; receiving information indicating conditions affecting the rate-of-climb for the aircraft; and determining automatically a rate-of-climb for the aircraft based on the gross weight, conditions affecting the rate-of-climb, and the set of data indicating the rate-of-climb.

In accordance with another embodiment of the present invention, a method of determining flight dynamics information comprises: determining automatically a gross weight for the aircraft; receiving at least one set of flight dynamics data for the aircraft; receiving information indicating conditions affecting the flight dynamics of the aircraft; and determining automatically at least one flight dynamics information for the aircraft based on the gross weight, conditions affecting the flight dynamics, and the set of flight dynamics data.

In accordance with another embodiment of the present invention, a flight preparation method comprises: determining automatically a gross weight for an aircraft; determining automatically a balance for the aircraft based on the gross weight; determining automatically a takeoff distance for the aircraft based on the gross weight; determining automatically a best rate of climb for the aircraft based on the gross weight; and determining automatically a fuel, a time, and a distance to change to an altitude.

In accordance with another embodiment of the present invention, an apparatus for determining a balance of an aircraft comprises: means for receiving a plurality of factors affecting the weight of an aircraft; means for determining automatically a gross weight for the aircraft based on the plurality of factors; means for receiving a datum indicating a center of lift for the aircraft; means for determining a plurality of moments based on the factors and the datum; means for determining at least one center of gravity based on the plurality of moments and the gross weight.

In accordance with another embodiment of the present invention, an apparatus for determining a take-off distance for an aircraft comprises: means for determining automatically a gross weight for the aircraft; means for receiving a set of take-off distance data for the aircraft; means for receiving information indicating conditions affecting the take-off distance for the aircraft; and means for determining automatically a take-off distance for the aircraft based on the gross weight, conditions affecting take-off distance, and the set of take-off distance data.

In accordance with another embodiment of the present invention, an apparatus for determining a rate of climb for an aircraft comprises: means for determining automatically a gross weight for the aircraft; means for receiving a set of data indicating a rate-of-climb for the aircraft; means for receiving information indicating conditions affecting the rate-of-climb for the aircraft; and means for determining automatically a rate-of-climb for the aircraft based on the gross weight, conditions affecting the rate-of-climb, and the set of data indicating the rate-of-climb.

In accordance with another embodiment of the present invention, an apparatus for determining flight dynamics information comprises: means for determining automatically a gross weight for the aircraft; means for receiving at least one set of flight dynamics data for the aircraft; means for receiving information indicating conditions affecting the flight dynamics of the aircraft; and means for determining automatically at least one flight dynamics information for the aircraft based on the gross weight, conditions affecting the flight dynamics, and the set of flight dynamics data.

In accordance with yet another embodiment of the present invention, a system for automated flight preparation comprises: a first module to determine automatically a gross weight for an aircraft; a second module to determine automatically a balance for the aircraft; a third module to determine automatically a take-off distance for the aircraft; a fourth module to determine a rate of climb for the aircraft; and a fifth module to determine at least one dynamics information for the aircraft.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 8 shows a before-take-off matrix used by the weight and balance determination module of FIG. 2.

FIG. 10 shows an after-landing matrix used by the weight and balance determination module of FIG. 2.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
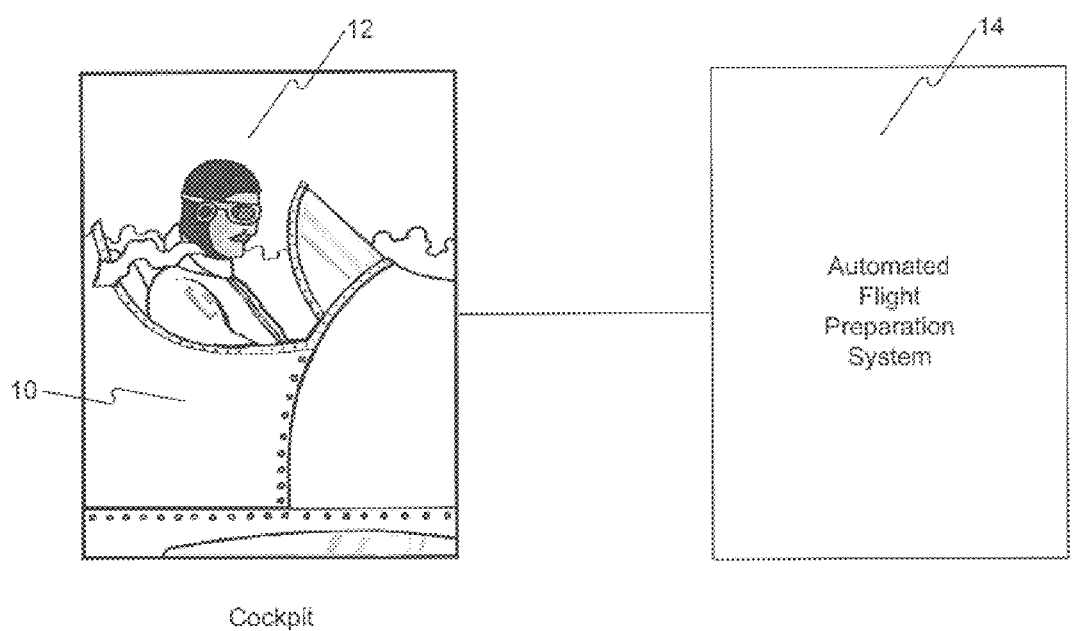
FIG. 1 shows an exemplary automated flight preparation system, consistent with the principles of the present invention.

FIG. 1 shows an exemplary automated flight preparation system, consistent with the principles of the present invention. In particular, as shown in FIG. 1, a pilot 12 is operating an aircraft 10 with an automated flight preparation system 14.

Figure 2:
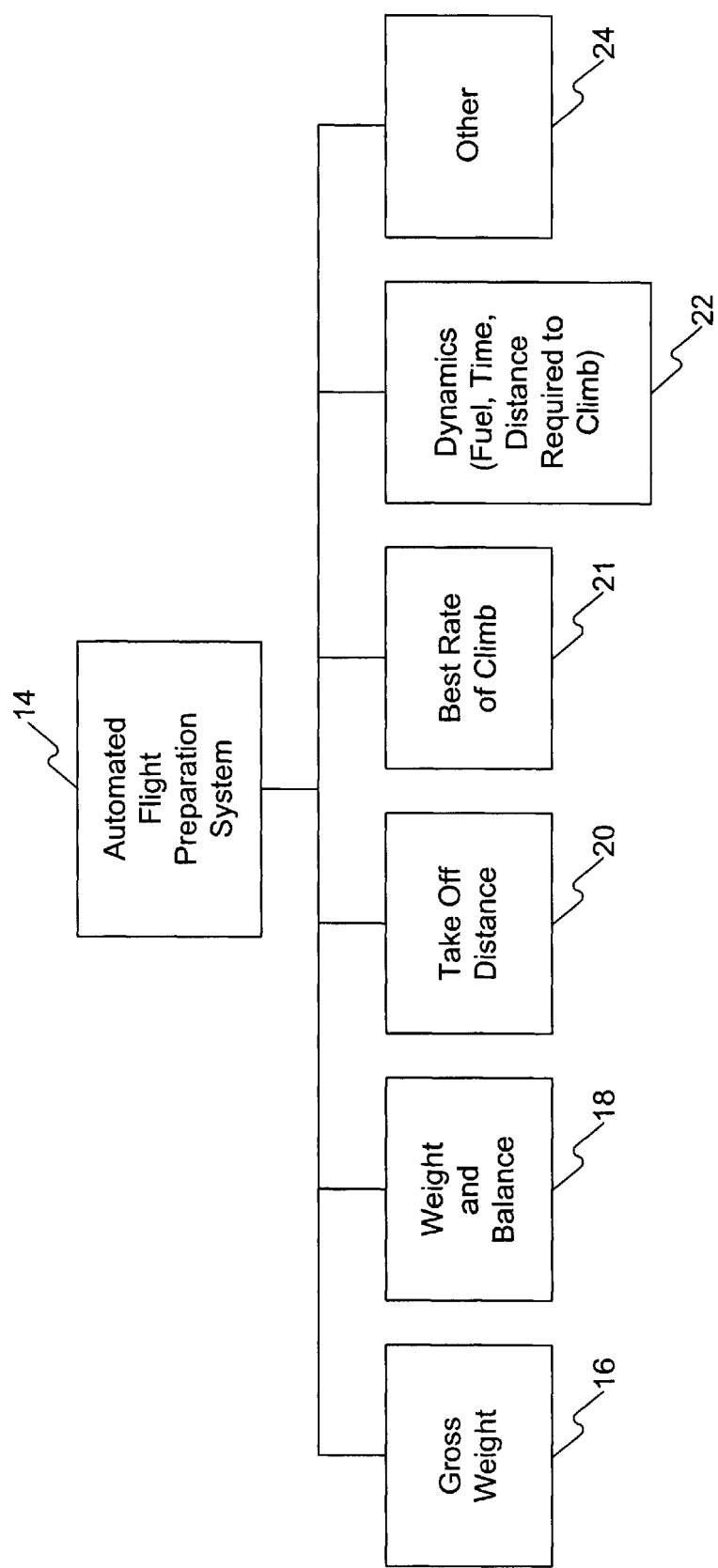
FIG. 2 shows several calculation modules of the automated flight preparation system of FIG. 1.

FIG. 2 shows automated flight preparation system 14 in greater detail. In particular, automated flight preparation system 14 is made up of several modules: a gross weight determination module 16; a weight and balance determination module 18; a take-off distance determination module 20, best rate-of-climb determination module 21; dynamics determination module 22; and other determination modules 24. In one embodiment, automated flight preparation system 14 calculates gross weight, weight and balance, take-off distance, best rate-of-climb, and flight dynamics, such as fuel, time, and distance. However, any type of determination module, e.g., airspeed system calibration, and power-off stall speed in angle of bank which may be used as part of a thorough flight preparation and/or which may aid in flight safety is consistent with the principles of the present invention.

Automated flight preparation system 14 and each module thereof may be implemented in hardware, software, or some combination of both hardware and software. For example, flight preparation system 14 may be implemented using one or more components such as a processor, an interface unit, a memory, and a user interface. The processor may be any of a wide variety of known processors such as a Pentium™ processor. For example, automated flight preparation system 14 may use a standard processor unit with non-volatile memory storing software (not shown), as known by those of ordinary skill in the art. In addition, the processor may be implemented using one or more sub-processors such as reduced instruction set computers or application specific integrated circuits. The interface unit may provide communications between the processor and other modules of flight preparation system 14. For example, the interface unit may include one or more ports to the user interface and sensors modules used by flight preparation system 14. The memory may be any type of memory including a disk drive, a compact disk drive, random access memory, read only memory or any combination thereof. The user interface may be implemented using a wide variety of known user interface devices including devices such as a display, a touch-screen display, a keyboard, a mouse, a joystick, etc. In addition, the user interface may be implemented using operating system software such as Microsoft Windows™, UNIX, LINUX, etc. Various different implementations are known to those of ordinary skill in the art and are consistent with the principles of the present invention.

Figure 3:
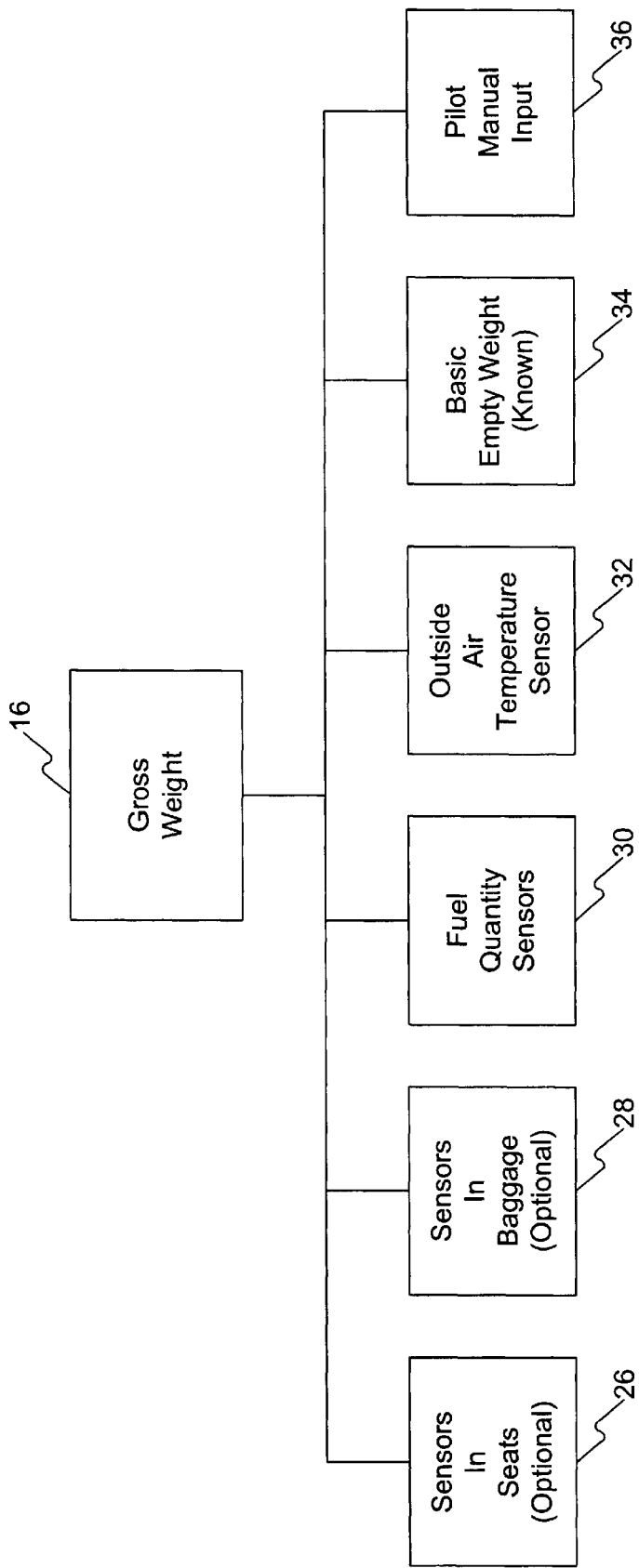
FIG. 3 shows a more detailed view of the gross weight calculation module of FIG. 2.

FIG. 3 shows a more detailed view a gross weight determination module 16. In particular, gross weight determination module 16 includes: a seat sensors module 26; a baggage compartment sensor module 28; a fuel quantity sensor module 30; an outside air temperature sensor module 32; a basic empty weight module 34; and a pilot manual input module 36. However, any module which may aid in the calculation of gross weight of an aircraft is consistent with the principles of the present invention. Gross weight determination module 16 may perform calculations at distinct times upon request by pilot 12 or may continuously calculate gross weight during flight operation.

Seat sensor module 26 determines the weight of pilot 12 and any passengers. In one embodiment, seat sensor module 26 receives input from weight sensors located throughout aircraft 10. However, any way of inputting the weight of a pilot and passengers, e.g., manual input, is consistent with the principles of the present invention.

Baggage compartment sensor module 28 determines the weight of any items loaded within the baggage compartment of aircraft 10. In one embodiment, baggage compartment sensor module 28 receives input from a weight sensor located within the baggage compartment of aircraft 10. However, any way of inputting the weight of baggage, e.g., manual input, is consistent with the principles of the present invention.

Fuel quantity sensor module 30 determines the volume of fuel currently carried by aircraft 10. In one embodiment, fuel quantity sensor module 30 receives input from a conventional fuel sensor located within the fuel tank (not shown) of aircraft 10. However, any way of determining fuel volume, e.g., manual input, is consistent with the principles of the present invention.

Outside air temperature sensor module 32 determines the outside air temperature to calculate fuel weight. In one embodiment, outside air temperature sensor module 32 receives input from one or more conventional air temperature sensors located on the external surface of aircraft 10. However, any way of measuring outside air temperature is consistent with the principles of the present invention.

Gross weight determination module 16 determines fuel weight by converting fuel quantity determined by fuel quantity sensor module 30 to weight, and adjusting for the outside air temperature determined by outside air temperature sensor module 32. In one embodiment, gross weight determination module 16 uses conventional adjustment calculations for determining fuel weight from fuel quantity, outside air temperature, and/or from a fuel probe. However, any way of calculating a fuel weight is consistent with the principles of the present invention.

Basic empty weight module 34 notes the known empty weight of aircraft 10. The basic empty weight may be adjusted as aircraft 10 is modified over time, e.g., retrofitted with different equipment and/or options. For example, the basic empty weight may be set by the manufacturer at the factory or manually input by a pilot or maintenance person. In one embodiment, basic empty weight module uses a set value stored in conventional non-volatile memory. However, any way of noting the empty weight of an aircraft is consistent with the principles of the present invention.

Pilot manual input module 36 allows the pilot 12 to enter data for calculating gross weight. For example, automated flight preparation system 14 may provide a conventional graphical user interface (not shown) which allows the pilot to manually enter the various parameters needed for calculating gross weight. The graphical user interface may also be used to confirm the information determined by the other sensor modules, e.g., seat sensor module 26.

However, in one embodiment, no manual input is required from pilot manual input module 36 in order for automated flight preparation system 14 to calculate a gross weight. Yet, any degree of pilot input/confirmation is consistent with the principles of the present invention.

Figure 4:
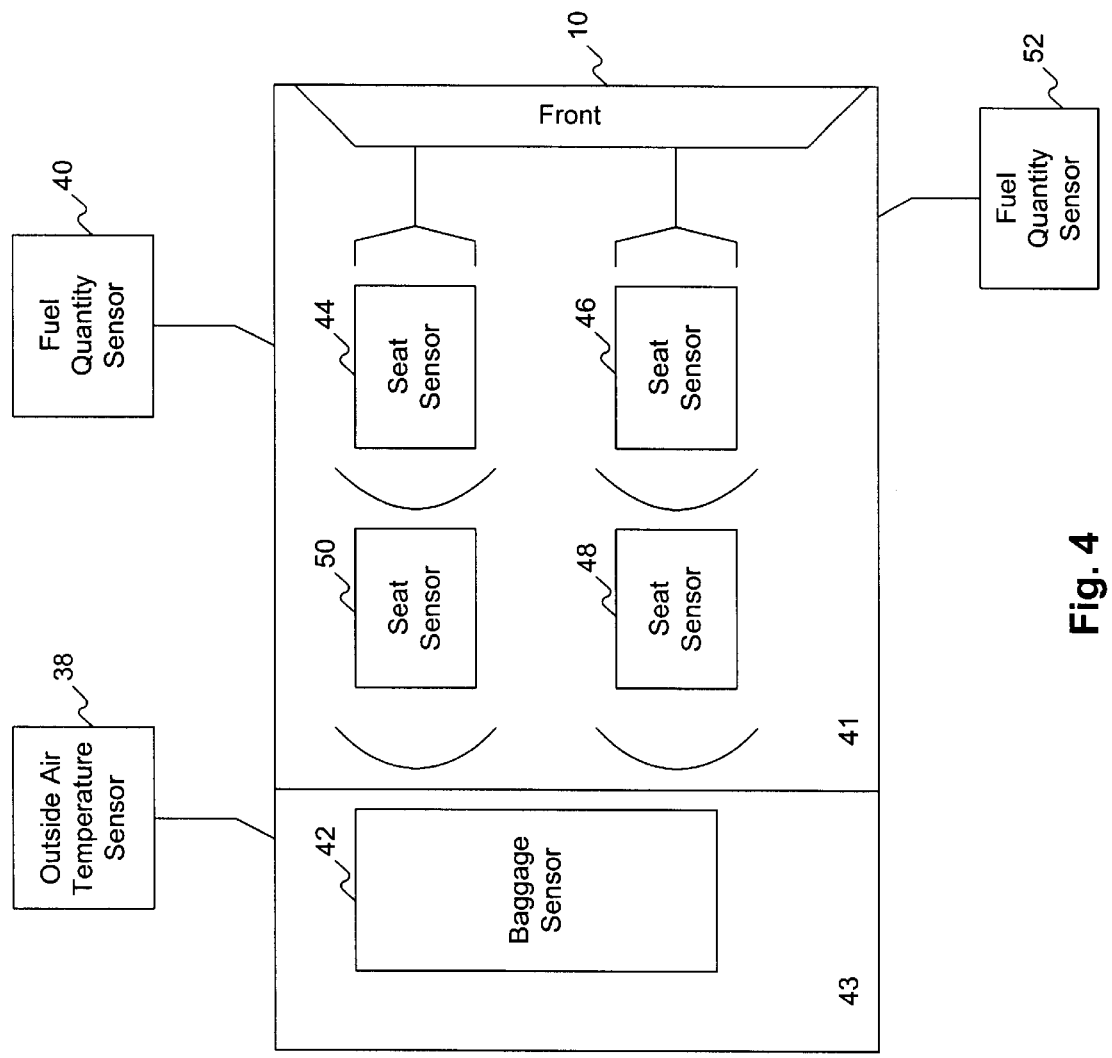
FIG. 4 shows the locations in an aircraft of sensors of the system of FIG. 1.

FIG. 4 shows the locations of sensors in aircraft 10. In particular, aircraft 10 is shown with seat sensors 44, 46, 48, 50 associated with each seat; a baggage sensor 42; an outside air temperature sensor 38; a first fuel quantity sensor 40; and a second fuel quantity sensor 52.

Seat sensors 44, 46, 48, and 50 automatically sense the weight of a person sitting in that particular seat and send signals to seat sensors module 26 to determine the total weight of persons within the passenger compartment 41 of aircraft 10. In one embodiment, seat sensors 44, 46, 48, and 50 are provided underneath or within each seat using conventional weight sensors. However, any sensor type and/or location which allows for determining total passenger compartment weight is consistent with the principles of the present invention.

Baggage sensor 42 automatically senses the weight of items loaded in baggage compartment 43. In one embodiment, baggage sensor 42 uses one or more conventional weight sensors. However, any way of determining total baggage weight is consistent with the principles of the present invention.

Outside air temperature sensor 38 automatically senses outside air temperature which is used in several calculations. For example, as noted above, outside air temperature is used to calculate fuel weight. In one embodiment, outside air temperature sensor uses one or more conventional temperature sensors located on the external surface of aircraft 10. However, any way of determining outside air temperature is consistent with the principles of the present invention.

Fuel quantity sensors 40 and 52 automatically sense the amount of fuel currently carried by aircraft 10. In one embodiment, fuel quantity sensors 40 and 52 use one or more conventional fuel sensors located within each fuel tank (not shown) of aircraft 10. However, any way of determining fuel quantity is consistent with the principles of the present invention.

Figure 5:
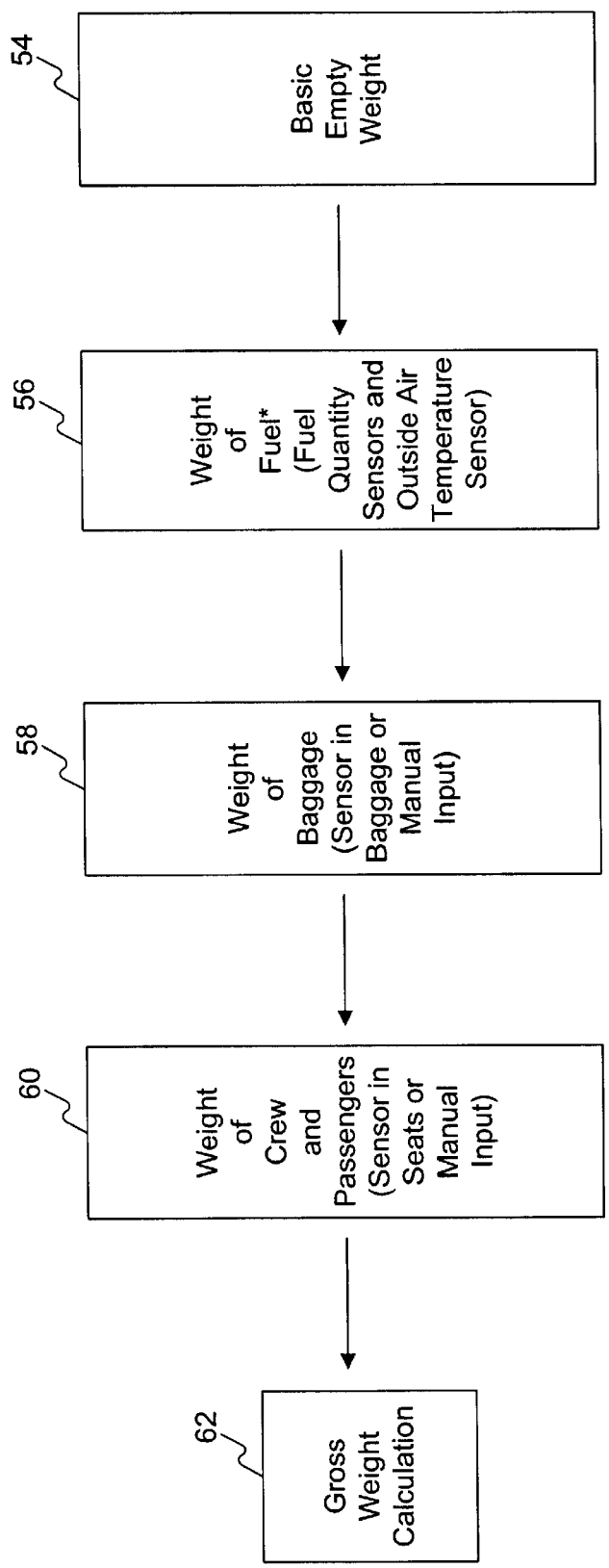
FIG. 5 shows an exemplary process for calculating the gross weight of an aircraft.

FIG. 5 shows an exemplary process used by gross weight determination module 16 for calculating the gross weight of aircraft 10. In stage 54, the basic empty weight is retrieved from basic empty weight module 34. In stage 56, the weight of fuel is determined. In one embodiment, gross weight determination module 16 uses outside air temperature and/or from a fuel probe to derive a fuel density, in a manner known by those of ordinary skill in the art. In this embodiment, gross weight determination module 16 then determines fuel weight by multiplying fuel quantity with the derived fuel density. However, any way of calculating fuel weight is consistent with the principles of the present invention.

In stage 58, the weight of baggage is retrieved from baggage sensor module 28. Then in stage 60, the weight of crew and passengers is retrieved from seat sensor module 26. In stage 62, gross weight is then calculated by summing the retrieved basic empty weight, the weight of fuel, baggage weight, and the weight of crew and passengers.

Figure 6:
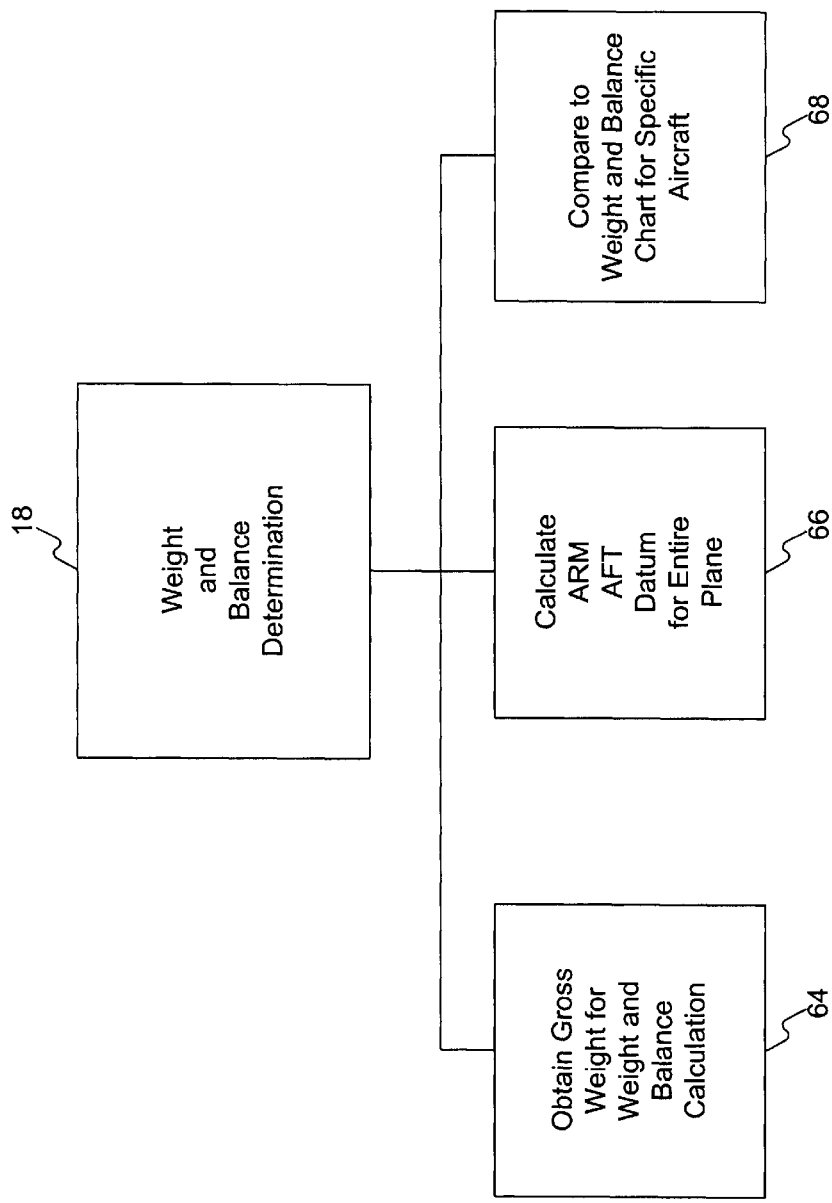
FIG. 6 shows the weight and balance determination module of FIG. 2.

FIG. 6 shows a weight and balance determination module as shown in FIG. 2. Weight and balance determination module 18 may perform calculations at distinct times upon request by pilot 12 or may continuously monitor weight and balance during flight operation. In particular, weight and balance determination module 18 comprises a gross weight for W/B calculation module 64, an arm aft datum calculation module 66, and a weight and balance chart module 68. Gross weight for W/B calculation module 64 calculates the current gross weight of aircraft 10 independent of gross weight calculation module 16, using the same data used by gross weight module 16.

Arm aft datum calculation module 66 aids in determining center of gravity information for aircraft 10, in one embodiment, using a matrix to determine required center of gravity information. "Arm aft" refers to the distance from an imaginary vertical plane datum through the center of lift an aircraft, from which all horizontal distances are measured for balance purposes. The balance of an aircraft is typically specified by the manufacturer and defined in a weight and balance chart provided in the pilot operation manual. Module 68 notes the specific weight and balance information included in a manual weight and balance chart. This data can be entered by the manufacturer at the factory or manually input by a pilot or maintenance person. The weight and balance chart data may also be adjusted as aircraft 10 is modified over time, e.g., retrofitted with different equipment and/or options. In one embodiment, module 68 uses set data values stored in conventional non-volatile storage. However, any way of storing the weight and balance chart information of an aircraft is consistent with the principles of the present invention.

Figure 7:
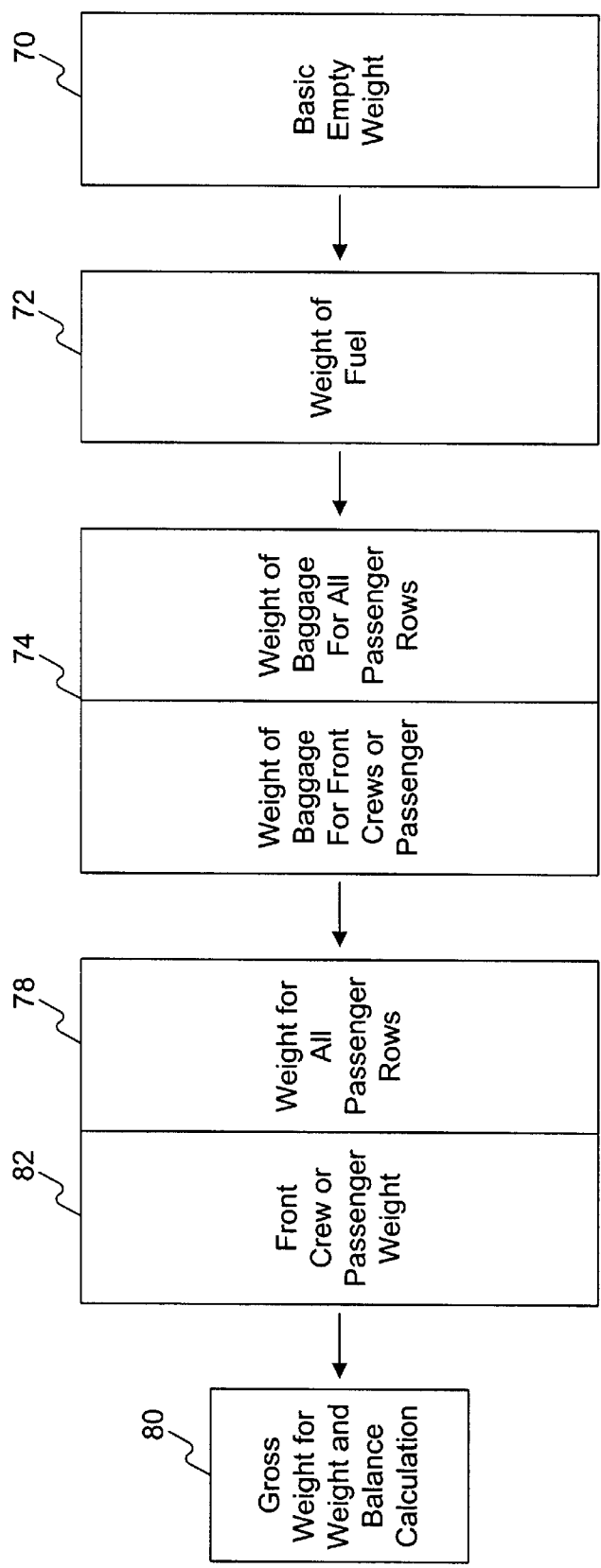
FIG. 7 shows an exemplary process for calculating weight and balance of an aircraft.

FIG. 7 shows an exemplary process for calculating weight and balance of an aircraft used by module 68. In stage 70, the basic empty weight is retrieved from basic empty weight module 34. In stage 72, the weight of fuel is determined, as noted above. In stage 74, the weight of baggage for all passenger rows and for front crews is retrieved from baggage sensor module 28. In stage 78, data is retrieved from seat sensor module 26, e.g., seat sensors 48 and 50. In stage 80, the weight of front crew or passenger weight is retrieved from seat sensor module, e.g., seat sensors 44 and 46. Gross weight is then calculated in stage 82 by summing the retrieved basic empty weight, the weight of fuel, baggage weight, and the weight of crew and passengers.

FIG. 8 shows a before-take off matrix used by the weight and balance determination module 18. In particular, a before-take off matrix 101 comprises: an empty arc row 84; a crew row 86; seat row rows 88–88*n*; a baggage row 90; a fuel row 92; a totals row 94; a weight column 96; an arm aft datum column 98; and a moment column 100.

In matrix 101, known and measured data is automatically entered by the weight and balance determination module 18 in the appropriate row and column. For example, empty arc row 84 receives item A, i.e., the empty airplane weight, and crew row 86 receives item D, i.e., the total front crew or passenger weight. Arm aft datum entries B and E represent distance from center of lift, which are determined by physical configuration of aircraft 10 and stored, for example, in non-volatile memory.

Based upon the known and measured data, moments are calculated by the weight and balance determination module 18 and entered in moment column 100, i.e., A X B, D X E, F X G, K X L, M X N, and P X R. Column 96 and column 100 are totaled and entered in totals row 94 resulting in items $T_1$ and $M_1$. Row 94, column 98 is $M_1$ over $T_1$.

Figure 9:
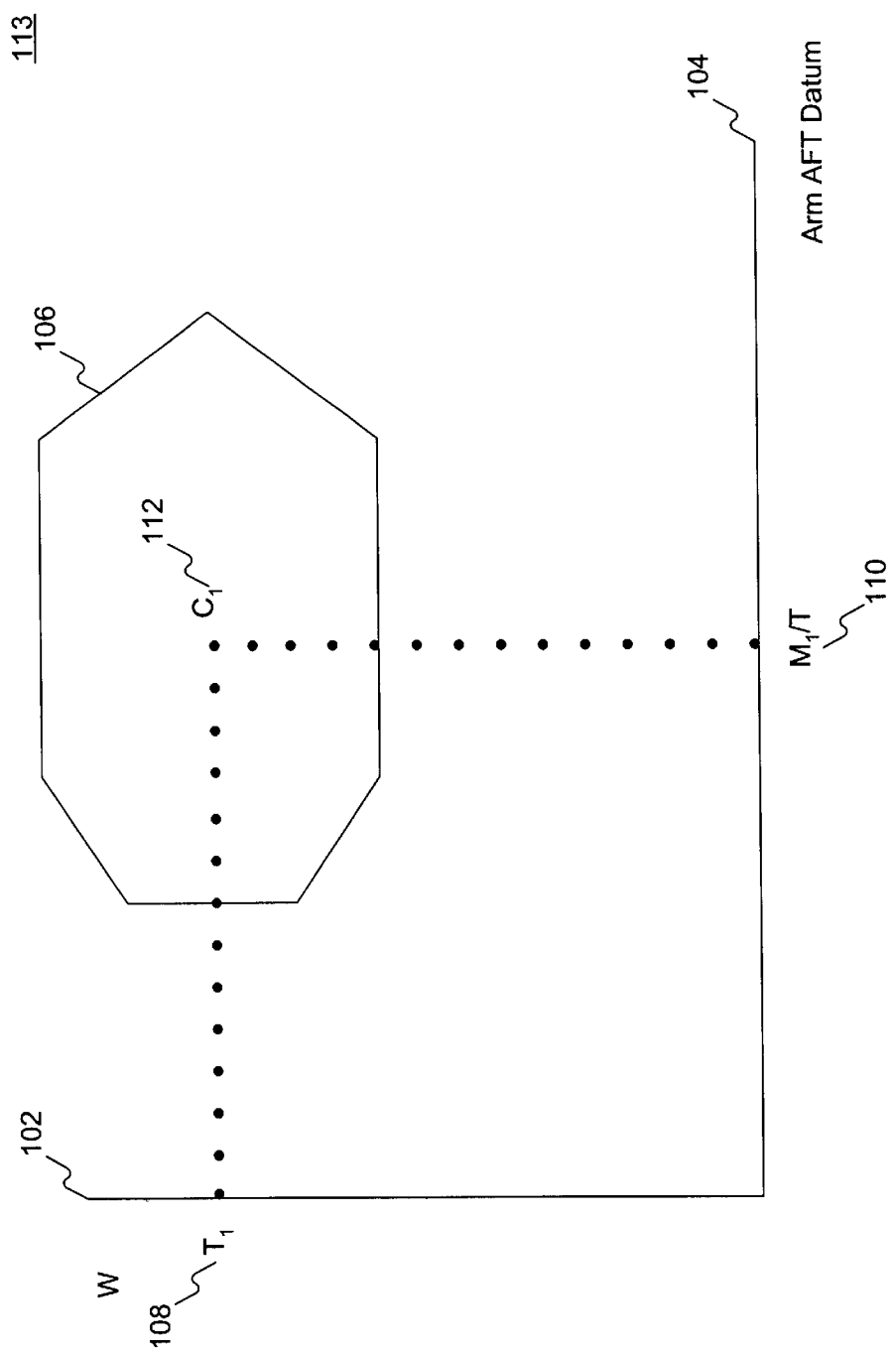
FIG. 9 shows a center of gravity chart with before-take-off data.

FIG. 9 shows a center of gravity chart with before-take-off data. In particular, a center of gravity chart 113 is shown with weight axis 102, an arm aft datum axis 104, and a center of gravity envelope 106.

Based on the gross weight of aircraft 10 at before-take-off, e.g. item T1, a horizontal line 108 can be plotted on chart 113. Datum M1/T1 results in a vertical line 110. Lines 108 and 110 intersect at 112 which is the center of gravity of a loaded airplane.

Weight and balance determination module 18 then determines if center of gravity 112 falls within the center of gravity envelope 106 of aircraft 10. If the calculated center of gravity is within center of gravity envelope 106, it means that the airplane is controllable and safe to fly. If the calculated center of gravity 112 falls outside that center of gravity envelope aircraft 10, it means that the airplane is not safe to fly with its present configuration. In this case, shifting of passengers or baggage, eliminating a passenger, reducing some weight, or reducing baggage would be necessary to permit aircraft 10 to fly safely.

FIG. 10 shows an after-landing matrix 135 representing data used by the weight and balance calculation module. In particular, an after-landing matrix 135 comprises: an empty arc row 114; a crew row 116; seat row rows 118–118*n*; a baggage row 120; a fuel row 122; a total gross weight row 124; a consumed fuel at end of flight row 126; a totals at destination row 128; a weight column 130; an arm aft datum column 132; and a moment column 134.

After-landing matrix 135 is similarly based upon the known and measured data used in before-take-off matrix 113. However, additional rows are added to account for aircraft conditions at the destination, i.e., a consumed fuel at end of flight row 126, and a totals at destination row 128.

Moments are again calculated by weight and balance determination module 18 and filled in along moment column 100, i.e., A X B, D X E, F X G, K X L, M X N, P X R, and Y X R.

Column 130 and column 134 are again totaled and noted in totals at destination row 128 resulting in items T-y and $M_2$. Column 132, row 128 is $M_2$ divided by T-y.

Figure 11:
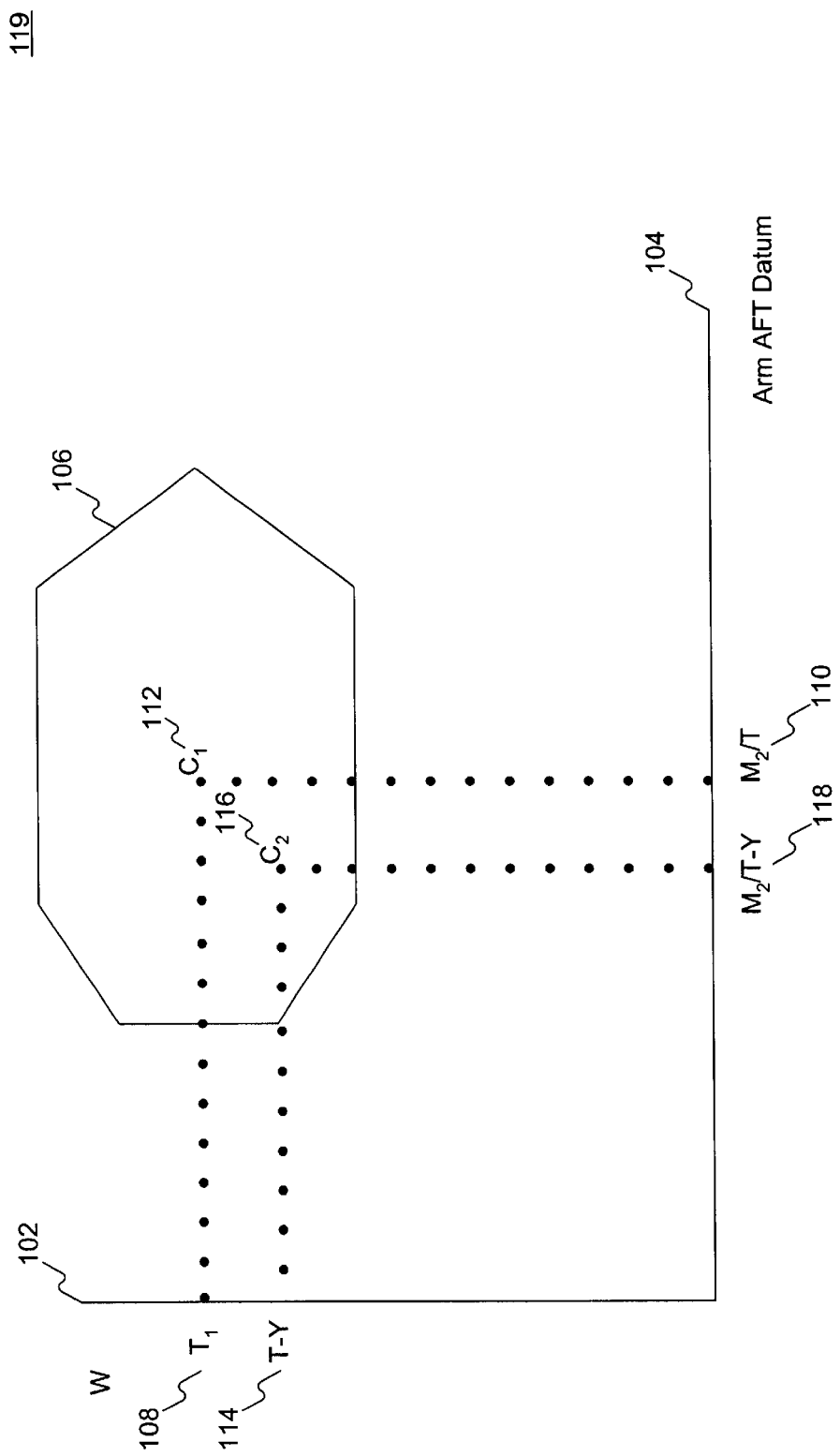
FIG. 11 shows a center of gravity chart with before-take-off data and after-landing data.

FIG. 11 shows a center of gravity chart representing before-take-off data and after-landing data. For illustrative purposes, before-take-off information from FIG. 9 is again provided.

In particular, as shown in FIG. 11, center of gravity chart 119 is shown with weight axis 102, an arm aft datum axis 104, and a center of gravity envelope 106 with center of gravity C1 112 and C2 116.

Based on the gross weight of aircraft 10 at after-landing, e.g. item T-Y, a horizontal line 114 may be plotted on center of gravity chart 119. Dividing datum M2 by T-Y results in a vertical line 118. Lines 114 and 118 intersect at C2 116 which is the center of gravity of aircraft 10 at after-landing, e.g., at the destination.

Weight and balance determination module 18 then determines if center of gravity 116, e.g., C2 falls within the center of gravity envelope 106 of aircraft 10 and displays the result. If the calculated center of gravity is within the center of gravity envelope 106, it means that the airplane is controllable and safe to fly. If it falls outside that center of gravity envelope 106, then that airplane is not safe to fly with its present configuration. In the second case, shifting of passenger, eliminating some passenger, or reducing some weight or baggage would be necessary to have that airplane flying safely.

Figure 12:
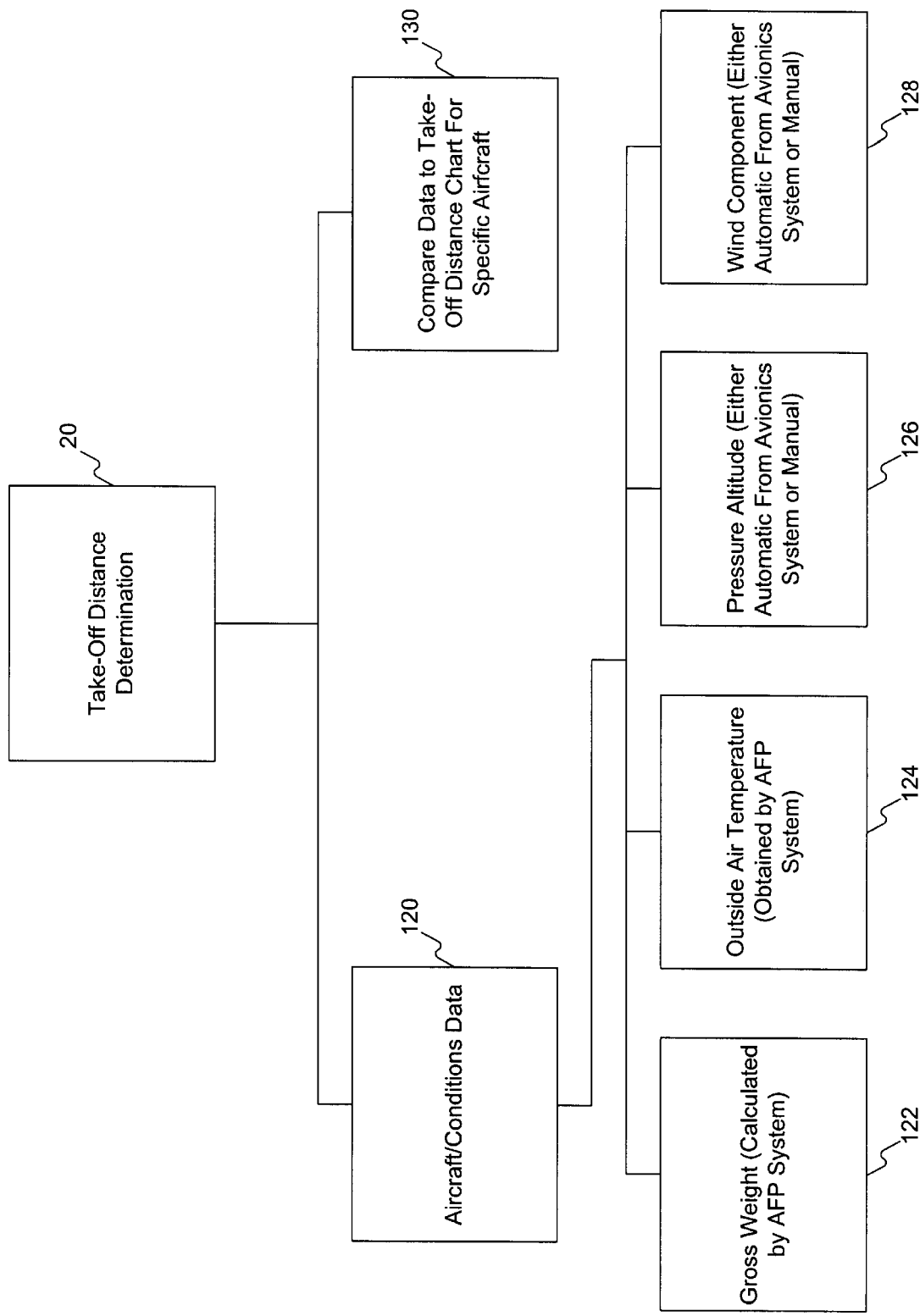
FIG. 12 shows a take-off determination module of FIG. 2.

FIG. 12 shows take-off distance determination module, in greater detail. In particular, take-off distance determination module 20 comprises an aircraft/conditions data module 120; a gross weight module 122; an outside air temperature module 124; a pressure altitude module 126; a wind component module 128; and a take-off distance chart for specific aircraft module 130.

The aircraft/conditions data module 120 retrieves information from gross weight module 122, outside air temperature module 124, pressure altitude module 126, and wind component module 128. Gross weight module 122 may be separate or integral with respect to gross weight determination module 16. In one embodiment, gross weight module 122 is integrated within gross weight determination module 16 and calculates gross weight in a similar manner. However, any way of calculating gross weight for take-off distance determination is consistent with the principles of the present invention.

Outside air temperature module 124 may be separate or integral with respect to outside air temperature sensor module 32. In one embodiment, outside air temperature module 124 is integrated within air temperature sensor module 32 and calculates outside air temperature in a similar manner. However, any way of measuring air temperature for take-off distance determination is consistent with the principles of the present invention.

Pressure altitude module 126 determines the current air pressure and altitude of aircraft 10. In one embodiment, pressure altitude module 126 automatically senses air pressure and altitude from conventional sensors provided with aircraft 10. However, any way of determining air pressure and altitude, e.g., manual input is consistent with the principles of the present invention.

Wind component module 128 determines wind direction and speed. In one embodiment, wind component module 128 relies upon conventional sensors provided with aircraft 10. However, any way of determining wind component data (e.g., manual input) is consistent with the principles of the present invention.

Take-off distance chart module 130 notes specific take-off distance information for aircraft 10. The take-off distance chart data may be set by the manufacturer at the factory or manually input by a pilot or maintenance person. The take-off distance chart may also be adjusted as aircraft 10 is modified over time, e.g., retrofitted with different equipment and/or options. In one embodiment, take-off distance determination module 20 uses a set value stored in conventional non-volatile storage. However, any way of noting the take-off distance information of an aircraft is consistent with the principles of the present invention.

Figure 13:
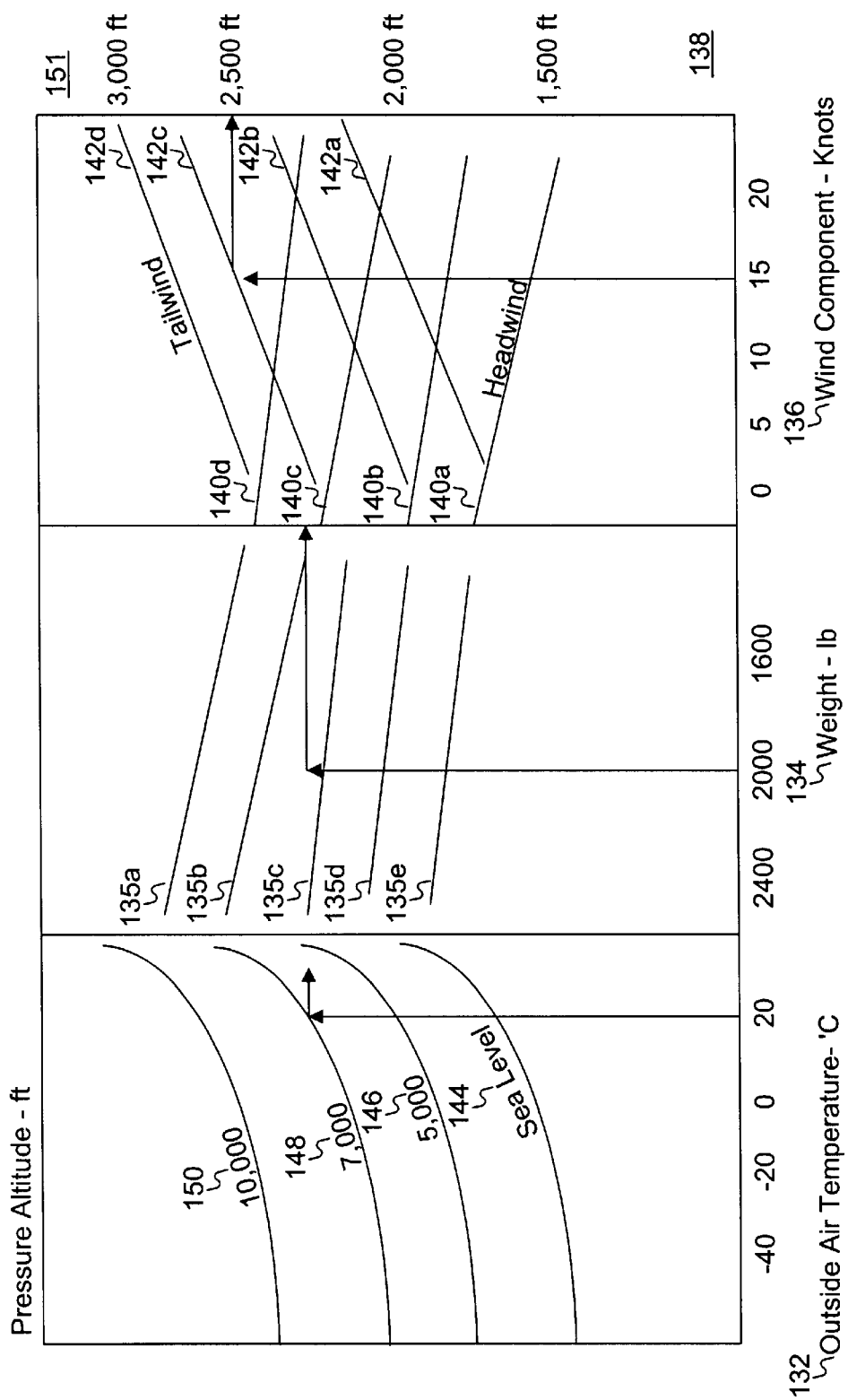
FIG. 13 shows a chart used the take-off determination module of FIG. 12.

FIG. 13 shows a take-off distance chart representing data and calculations of the type used by take-off determination module 20, consistent with the principles of the present invention. In particular, take-off distance chart 151 is comprised of an outside air temperature section 132, a weight section 134, and a wind component section 136. Outside air temperature section 132 may contain one or more curves, e.g., curves 144, 146, 148, and 150 which correspond to various pressure altitudes. For purposes of illustration, assume an outside air temperature of 20° C., a pressure altitude of 7000 feet, a gross weight of 2000 pounds, and a tailwind of 15 knots as one set of conditions for aircraft 10. A vertical line corresponding to 20° C. may be drawn to one of the pressure altitude curves, i.e., curves 144, 146, 148, and 150, from outside air temperature section 132. Curve 148 may be selected since it corresponds to a pressure altitude of 7000 feet. From the intersection point along curve 148, a horizontal line may be drawn to select one of the curves, i.e., curves 135a–135e, from weight section 134. For example, under the conditions noted above, curve 135c is selected and a vertical line corresponding to 2000 pounds may then be drawn to intersect curve 135c. From the intersection point along curve 135c, a horizontal line is drawn to select one of the curves, i.e., curves 140a–140d and 142a–142d, from wind component section 136. As shown in FIG. 13, wind component section 136 comprises two sets of curves. Curves 140a–140d may be used in headwind conditions and curves 142a–142d may be used in tailwind conditions. Accordingly, under the conditions noted above, curve 142c is selected and a vertical line corresponding to 15 knots may then be drawn to intersect curve 142c. From the intersection point along curve 142c, a horizontal line may then be drawn to axis 138 to indicate a minimum take-off distance for the circumstances noted above, i.e., 2,500 feet. The minimum take-off distance, e.g., 2,500 feet, may then be displayed. Of course, data used by take-off distance chart module 130 may be stored in a form different from FIG. 13, but FIG. 13 shows the types of calculations which may be used consistent with the principles of the present invention.

Figure 14:
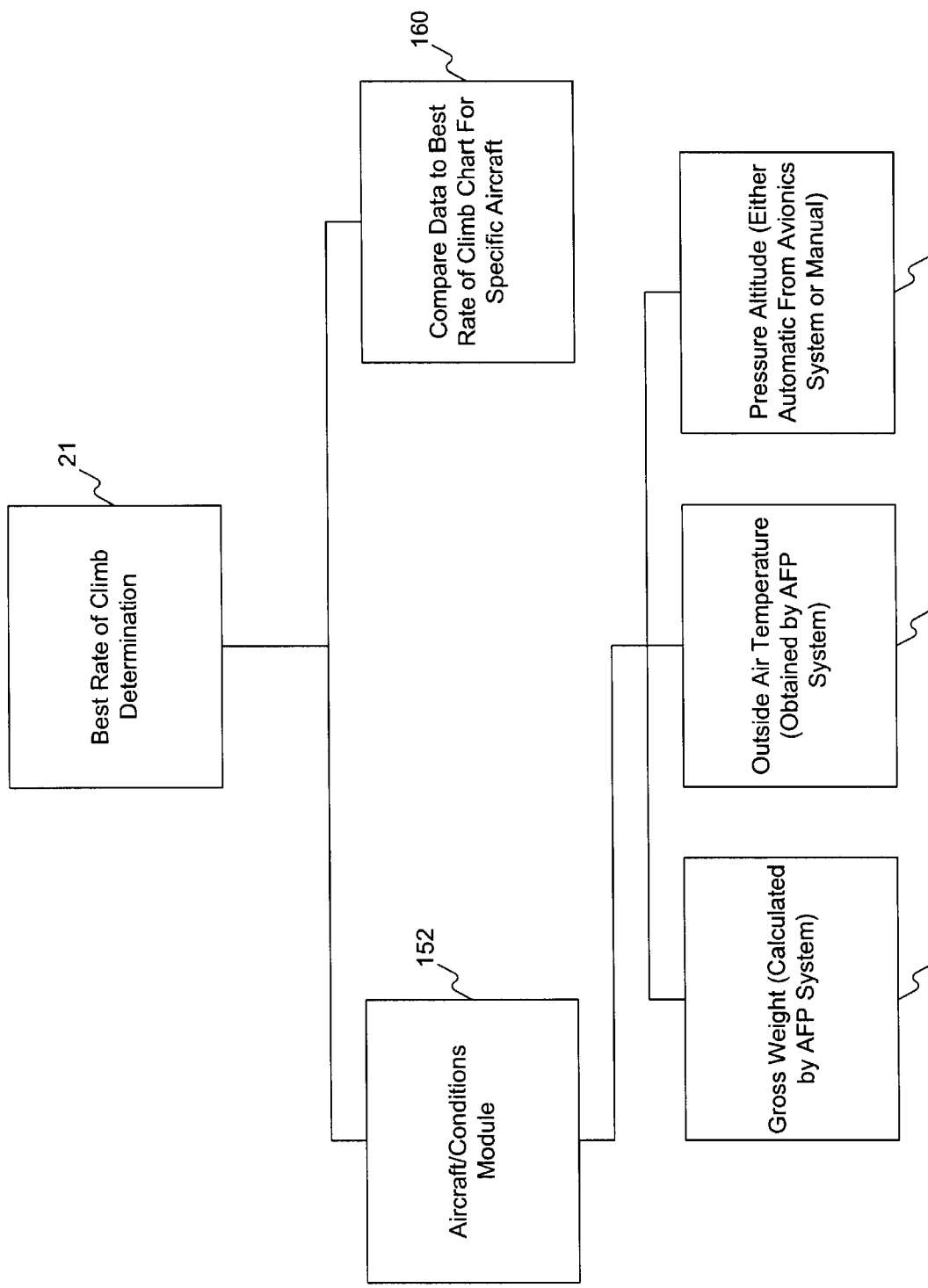
FIG. 14 shows a best rate-of-climb determination module of FIG. 2.

FIG. 14 shows a best rate-of-climb calculation module, consistent with the principles of the present invention. In particular, best rate-of-climb calculation module 20 comprises an aircraft/conditions module 152, a gross weight module 154, an outside air temperature module 156, a pressure altitude module 158, and a best rate-of-climb chart for specific aircraft module 160.

The aircraft/conditions data module 152 retrieves information from the gross weight module 154, outside air temperature module 156, pressure altitude module 158. The aircraft/conditions data module 152 may be separate or integral with respect to aircraft conditions data module 120. In one embodiment, aircraft/conditions data module 152 is integral with aircraft/conditions data module 120. However, any arrangement for determining aircraft/conditions data for best rate-of-climb is consistent with the principles of the present invention.

Rate-of-climb chart module 160 notes specific rate-of-climb information for aircraft 10. The rate-of-climb chart data may be set by the manufacturer at the factory or manually input by a pilot or maintenance person. The rate-of-climb chart may also be adjusted as aircraft 10 is modified over time, e.g., retrofitted with different equipment and/or options. In one embodiment, best rate of climb determination module 21 uses a set value stored in conventional non-volatile storage. However, any way of noting the rate-of-climb information of an aircraft is consistent with the principles of the present invention.

Figure 15:
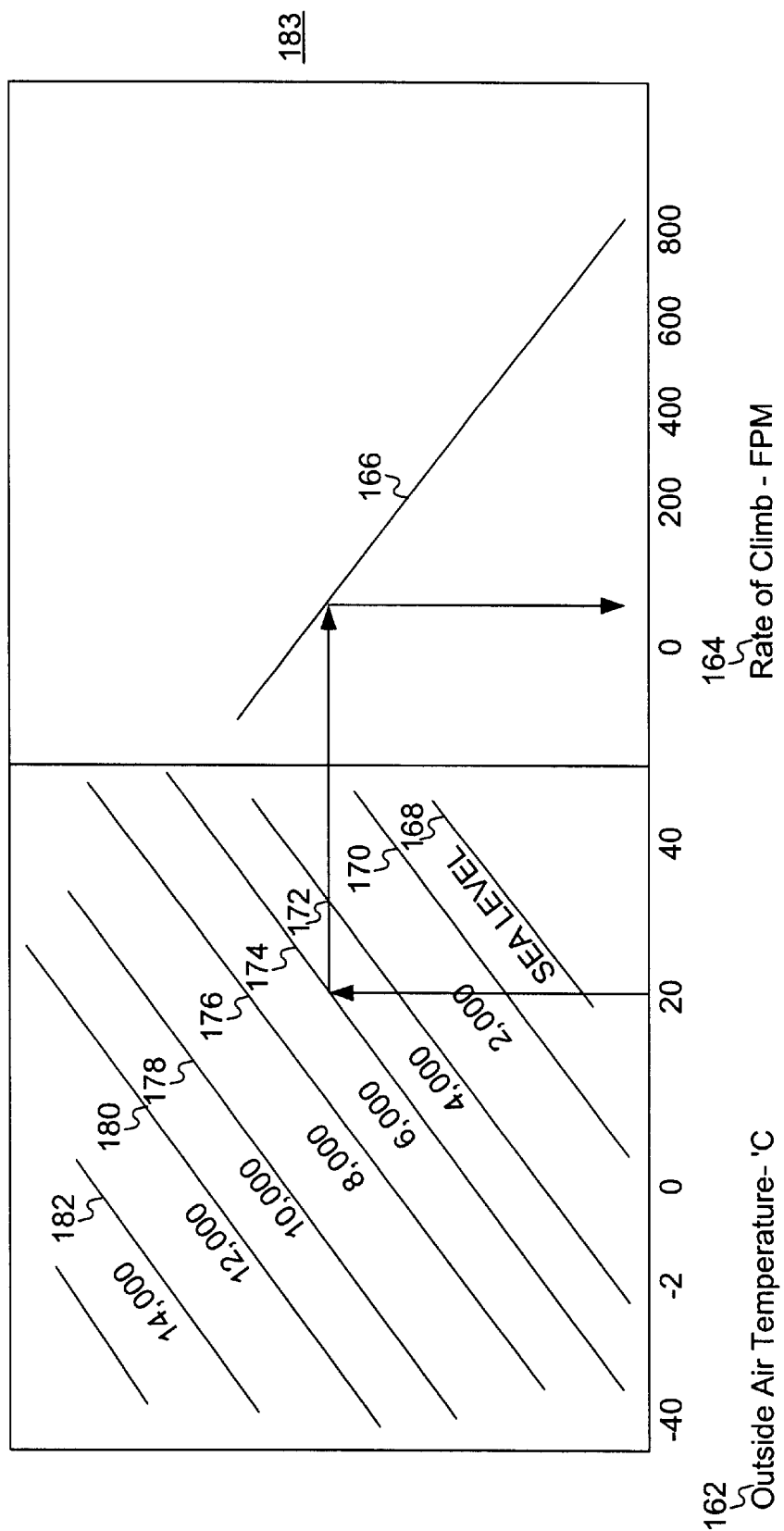
FIG. 15 shows a chart used by the best rate-of-climb determination module of FIG. 14.

FIG. 15 shows a chart representing data and calculations of the type used by the best rate-of-climb calculation module, consistent with the principles of the present invention. In particular, rate of climb chart 183 is comprised of an outside air temperature section 162 and a rate-of-climb section 164.

Outside air temperature section has different curves (170, 172, 174, 176, 178, 180, and 182) based upon the pressure altitude. Rate-of-climb section 164 provides rate-of-climb curve 166.

For example, for purposes of illustration, starting with outside air temperature section 162, a vertical line from the measured outside air temperature (e.g., 20° C.) is drawn until it intersects with the actual pressure altitude (e.g., 6000 feet). A horizontal line may then be drawn to rate-of-climb section 164 until it intersects with rate-of-climb curve 166. A vertical line may then be drawn straight down to derive a best rate-of-climb (e.g., between 0 to 200 feet per minute). The resulting best rate-of-climb may then be displayed.

Figure 16:
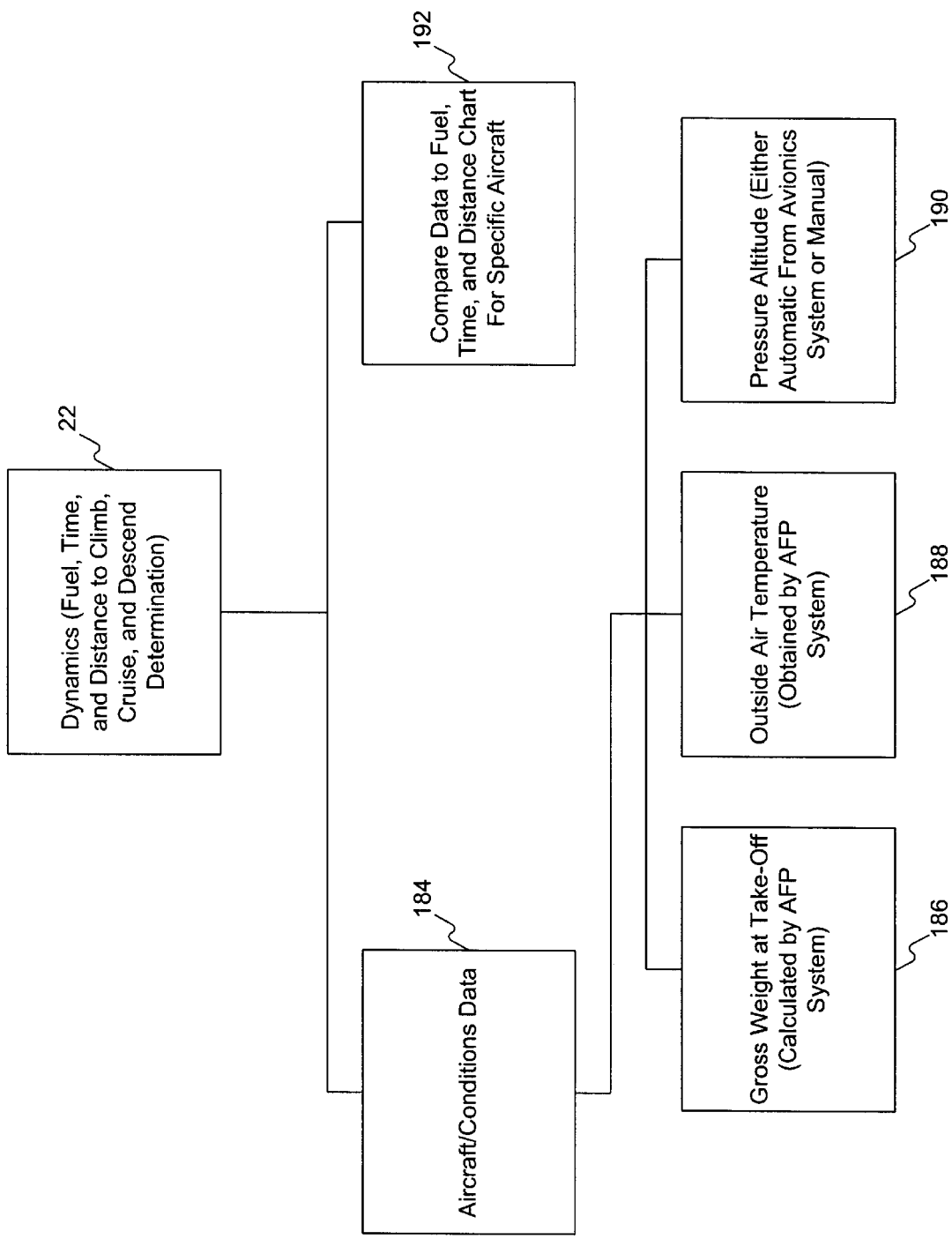
FIG. 16 shows a dynamics calculation module of FIG. 2.

FIG. 16 shows a dynamics determination module, consistent with the principles of the present invention. In particular, dynamics determination module 22 is comprised of an aircraft/conditions data module 184, a gross weight module 186, an outside air temperature module 188, a pressure altitude module 190, and a fuel, time and distance chart module 192.

The aircraft/conditions data module 184 retrieves information from the gross weight module 186, outside air temperature module 188, pressure altitude module 190. The aircraft/conditions data module 184 may be separate or integral with respect to aircraft conditions data module 120. In one embodiment, aircraft/conditions data module 184 is integral with aircraft/conditions data module 120. However, any arrangement for determining aircraft/conditions data for aircraft dynamics is consistent with the principles of the present invention.

Dynamics chart module 192 notes specific flight dynamics information for aircraft 10. In one embodiment, dynamics chart module 192 calculates fuel, time, and distance information. However, any information which aids in calculating dynamic flight performance of an aircraft is consistent with the principles of the present invention. The dynamics information chart may be set by the manufacturer at the factory or manually input by a pilot or maintenance person. The dynamics information may also be adjusted as aircraft 10 is modified over time, e.g., retrofitted with different equipment and/or options. In one embodiment, dynamics determination module 22 uses a set value stored in conventional non-volatile memory. However, any way of noting dynamics information of an aircraft is consistent with the principles of the present invention.

Figure 17:
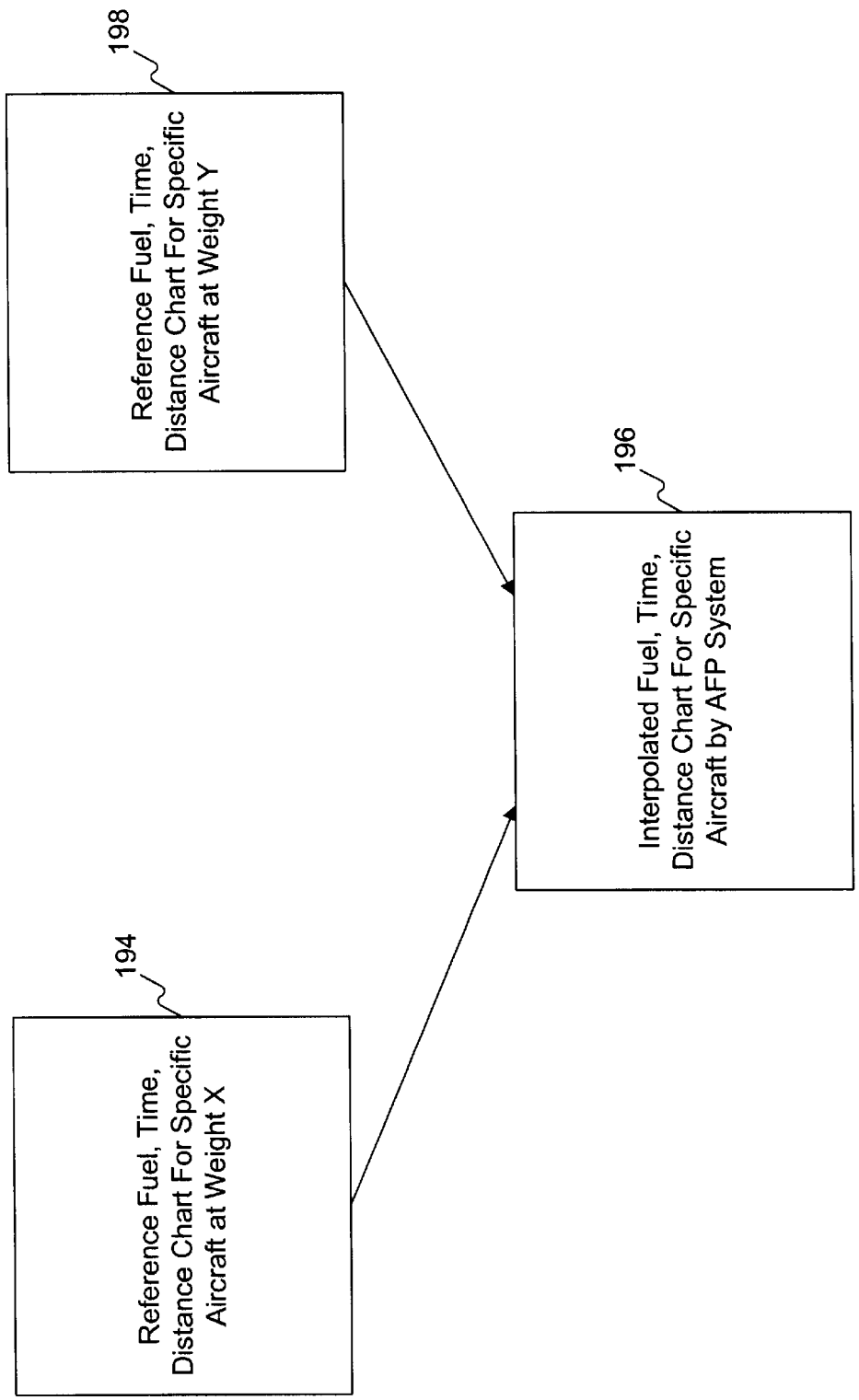
FIG. 17 shows the charts used by the dynamics calculation module of FIG. 16.

FIG. 17 shows the charts representing data used by the dynamics determination module 22. In particular, an interpolated fuel, time, and distance chart 196 uses a reference fuel, time and distance at weight X chart 194 and a reference fuel, time and distance at weight Y chart 198. Although two charts are shown, automated flight preparation system 14 allows multiple dynamics charts for almost every specific weight of aircraft 10. In one embodiment, two charts with interpolation for each specific weight is used. However, any way of combining data representing a number of charts to interpolate a specific weight may be used by dynamics determination module 22 consistent with the principles of the present invention.

Figure 18:
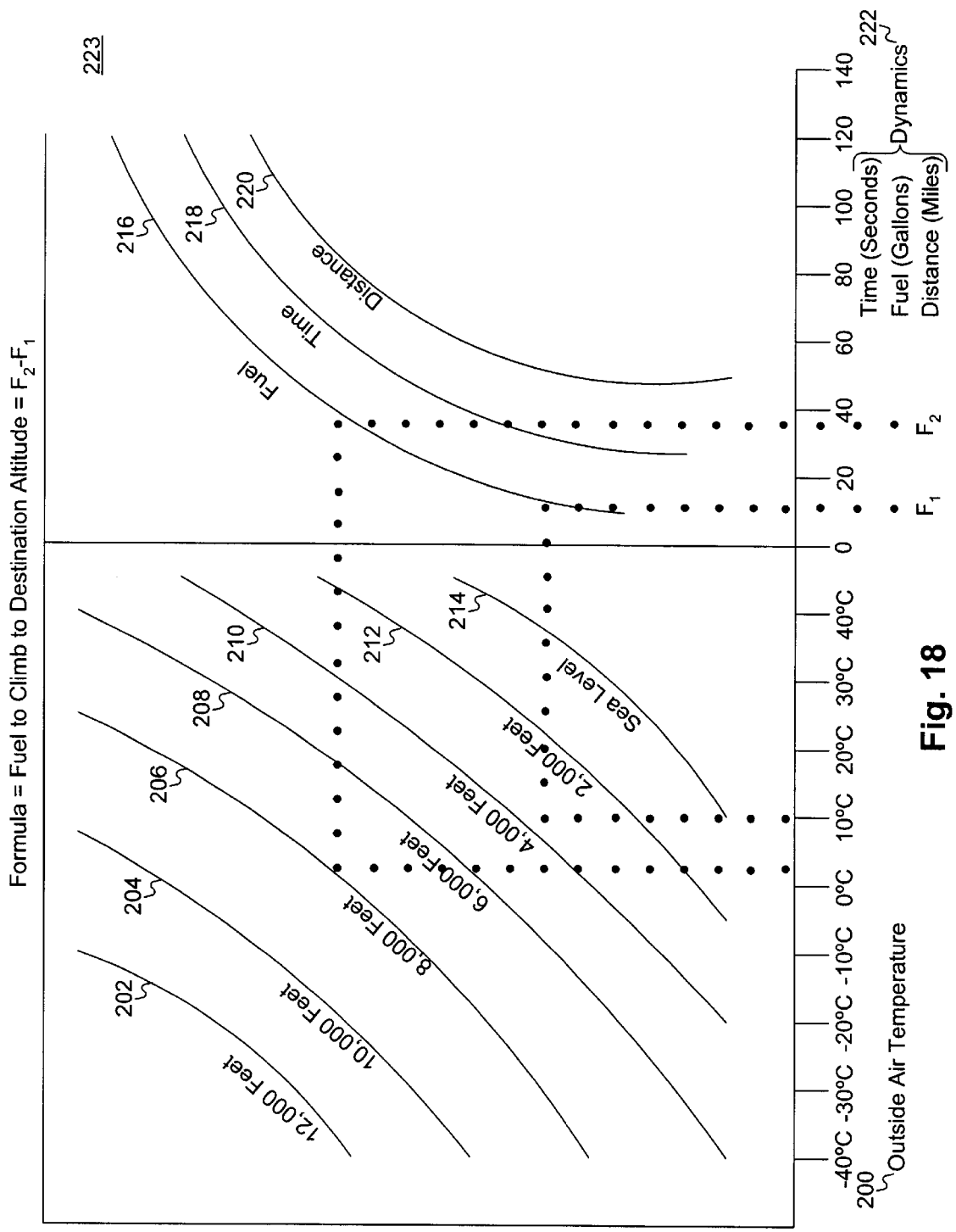
FIG. 18 shows a more detailed depiction of a fuel-to-climb calculation used by the dynamics calculation module of FIG. 16.

FIG. 18 shows a more detailed depiction of a fuel-to-climb calculation used by the dynamics determination module 22. In particular, a fuel-to-climb calculation references an outside air temperature section 200, and a dynamics section 222. Outside air temperature section is shown ranging from ⁻40 to ⁺40C. with pressure altitude curves (202, 204, 206, 208, 210, 212, and 214) from sea level to 12,000 feet.

In particular, to represent a fuel calculation, a vertical line going from the actual outside air temperature going up until it intersects with the pressure altitude of the airport is drawn. A corresponding direct horizontal line is then drawn that will intersect with fuel curve 216 in the dynamics section 222. A vertical line is then drawn downward corresponding to read the quantity of the fuel.

Dynamics section 222 is shown to read values between 0 and 140 at increments of 20. These values may be associated to time in seconds, fuel in gallon, or distance in miles. However, any scale and units may be used consistent with the principles of the present invention. The result is then displayed to pilot 12.

As an example, if the pilot desires to climb from 4,000 to 8,000 feet, a vertical line at 4,000 and 8,000 feet and is drawn, using the applicable respective outside air temperatures, e.g., 10° C. and 2° C. Horizontal lines may then be drawn to fuel curve 216. Vertical lines may then be drawn downward to read F1 and F2 fuel quantities. Therefore, the fuel-to-climb in the present example corresponds to F2–F1, a result which may be displayed to pilot 12.

Figure 19:
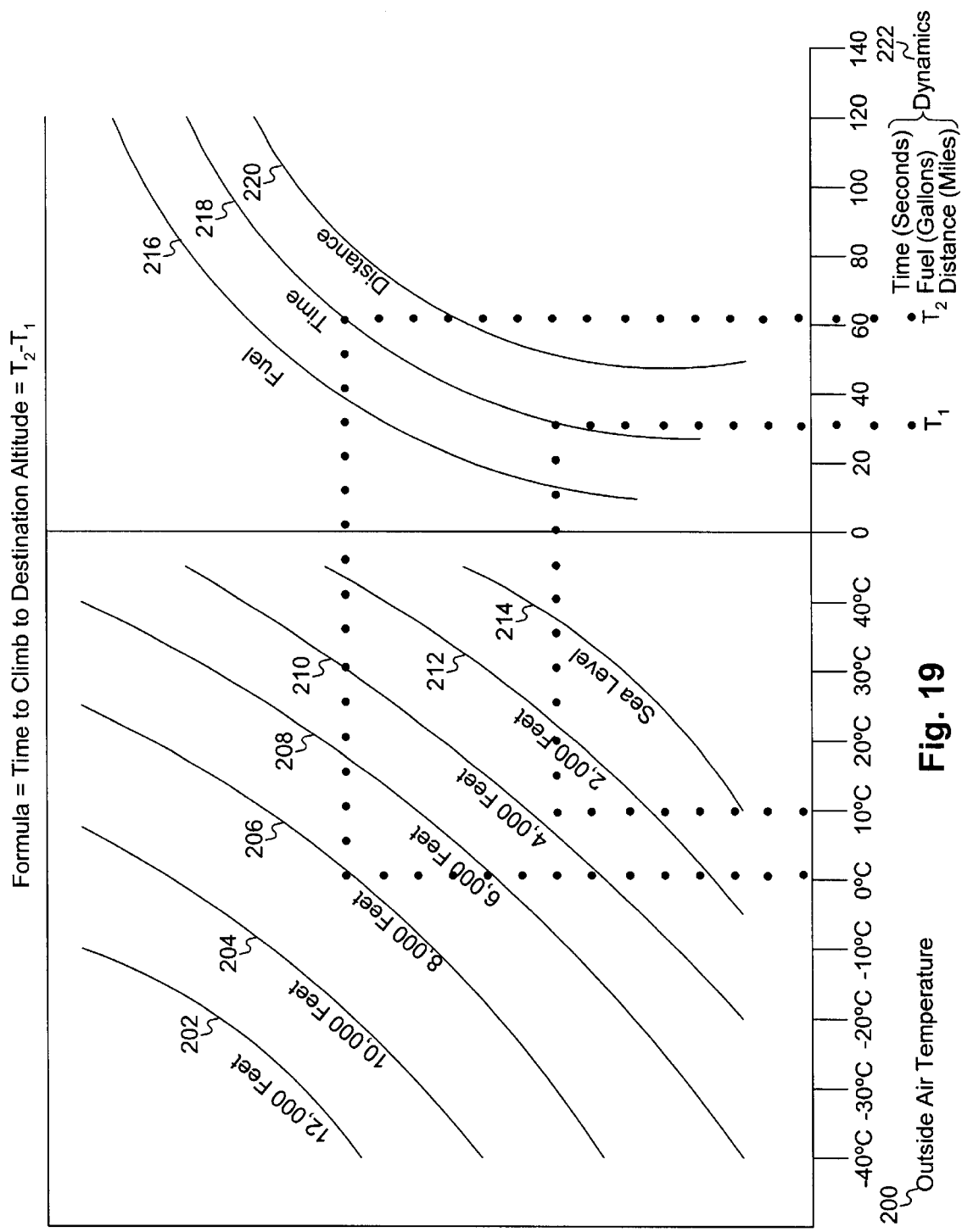
FIG. 19 shows a more detailed depiction of a time-to-climb calculation used by the dynamics calculation module of FIG. 16.

FIG. 19 shows a more detailed depiction of a time-to-climb calculation used by the dynamics determination module 22. For example, a vertical line going from the actual outside air temperature may be drawn upward until it intersects with the pressure altitude of the airport. A corresponding direct horizontal line is then drawn that will intersect with a time curve 218 in the dynamics section 222. A vertical line is then drawn corresponding to read a time in seconds, e.g., T1, which is displayed to pilot 12.

As an example, if the pilot desires to climb from 4,000 to 8,000 feet, vertical lines are drawn at 4,000 and 8,000 feet using the correct outside air temperature. Horizontal lines are then drawn to time curve 218. Vertical lines then drop vertically to read T1 and T2 seconds. Therefore, the time-to-climb in the present example corresponds to T2–T1.

Figure 20:
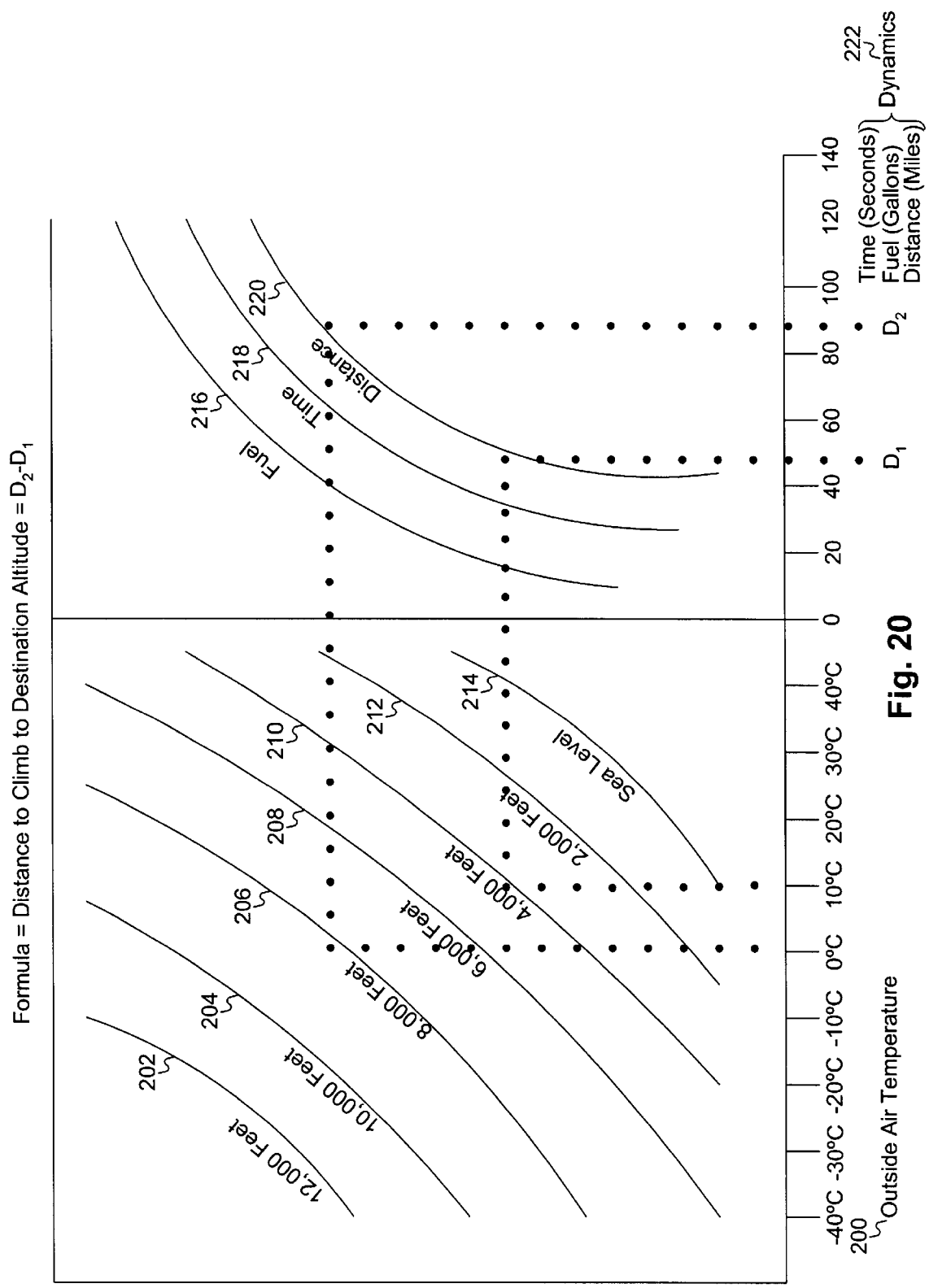
FIG. 20 shows a more detailed depiction of a distance-to-climb calculation used by dynamics calculation module of FIG. 16.

FIG. 20 shows a more detailed depiction of a distance-to-climb calculation used by dynamics determination module 22. For example, a vertical line going from the actual outside air temperature going up until it intersects with the pressure altitude of the airport is drawn. A corresponding direct horizontal line is then drawn that will intersect with distance curve 220 in the dynamics section 222. A vertical line is then drawn corresponding to read a distance of D1, which is displayed to pilot 12.

As an example, if the pilot desires to climb from 4,000 to 8,000 feet, vertical lines are drawn at 4,000 and 8,000 feet, using the correct outside air temperature. Horizontal lines are then drawn to distance curve 220. Vertical lines then drop vertically to read a distance of D1 and D2. Therefore, the distance-to-climb in the present example corresponds to D2–D1 miles.

Figure 21:
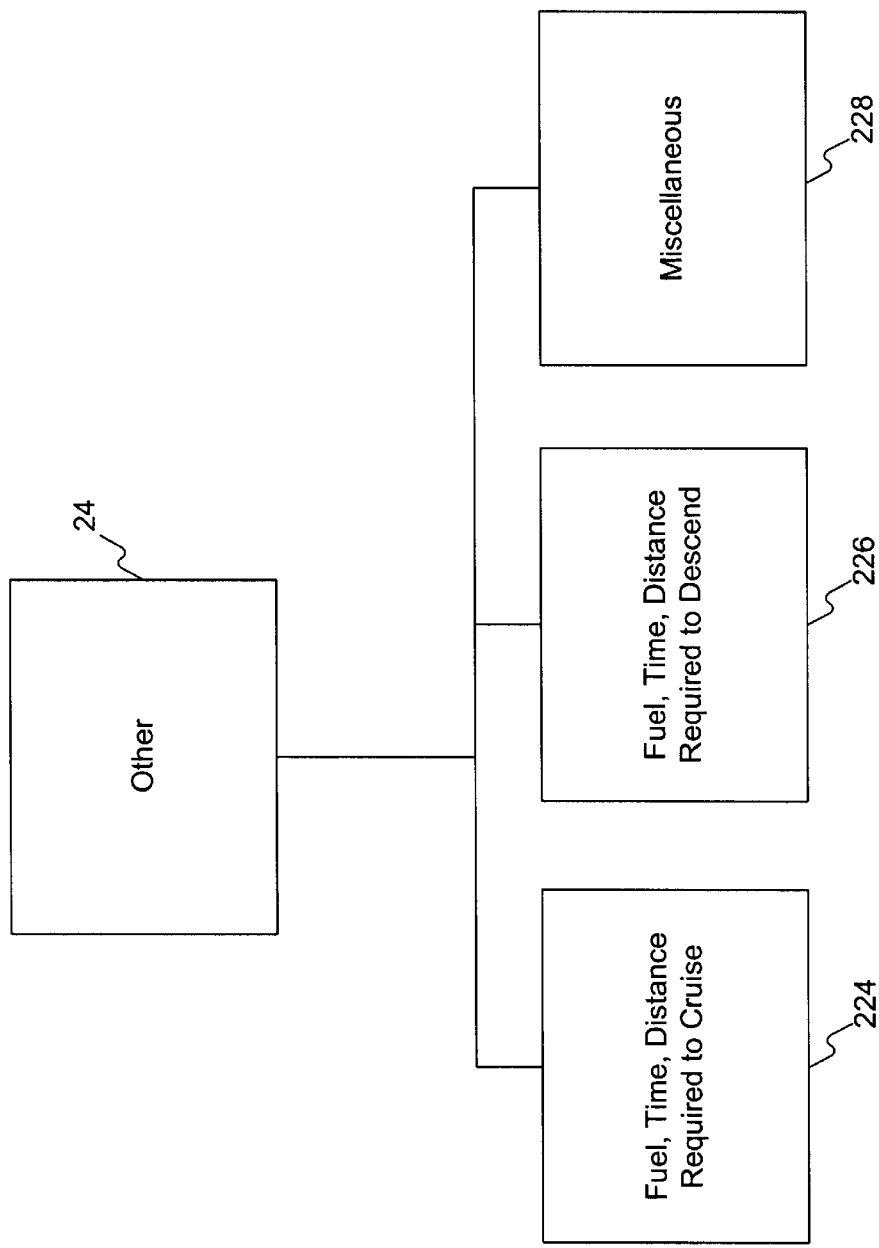
FIG. 21 shows another calculation module of FIG. 2.

FIG. 21 shows other determination modules (or calculation modules). In particular, as shown in FIG. 21, other determination module 24 may include a fuel, time and distance to cruise calculation module 224, a fuel, time and distance to descend calculation module 226, and miscellaneous calculation modules 228.

Other determination modules 24 may allow for other calculations such as total fuel consumption estimated for the trip, total miles, and other calculations. Any calculation which aids a pilot in flight preparation is consistent with the principles of the present invention. Other calculation module 24 utilizes similar calculation techniques as shown for dynamics module 22. In one embodiment, other calculation modules 24 utilize specific charts designed specifically for aircraft 10 to calculate fuel, time and distance to cruise, and fuel, time, and distance to descend.

Figure 22:
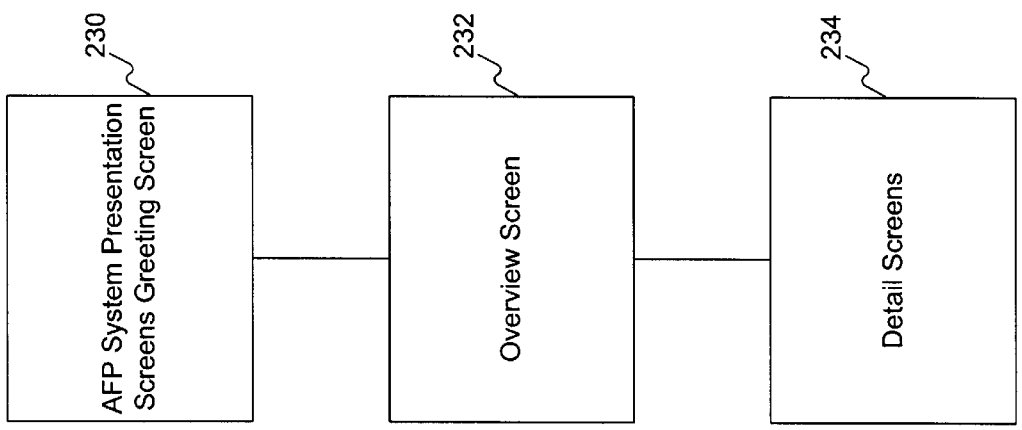
FIG. 22 shows a hierarchy of presentation screens used by the system of FIG. 1.

FIG. 22 shows a hierarchy of display screens which may be presented to pilot 12. In particular, the hierarchy of display screens comprises a greeting screen 230, an overview screen 232, and detail screens 234.

Figure 23:
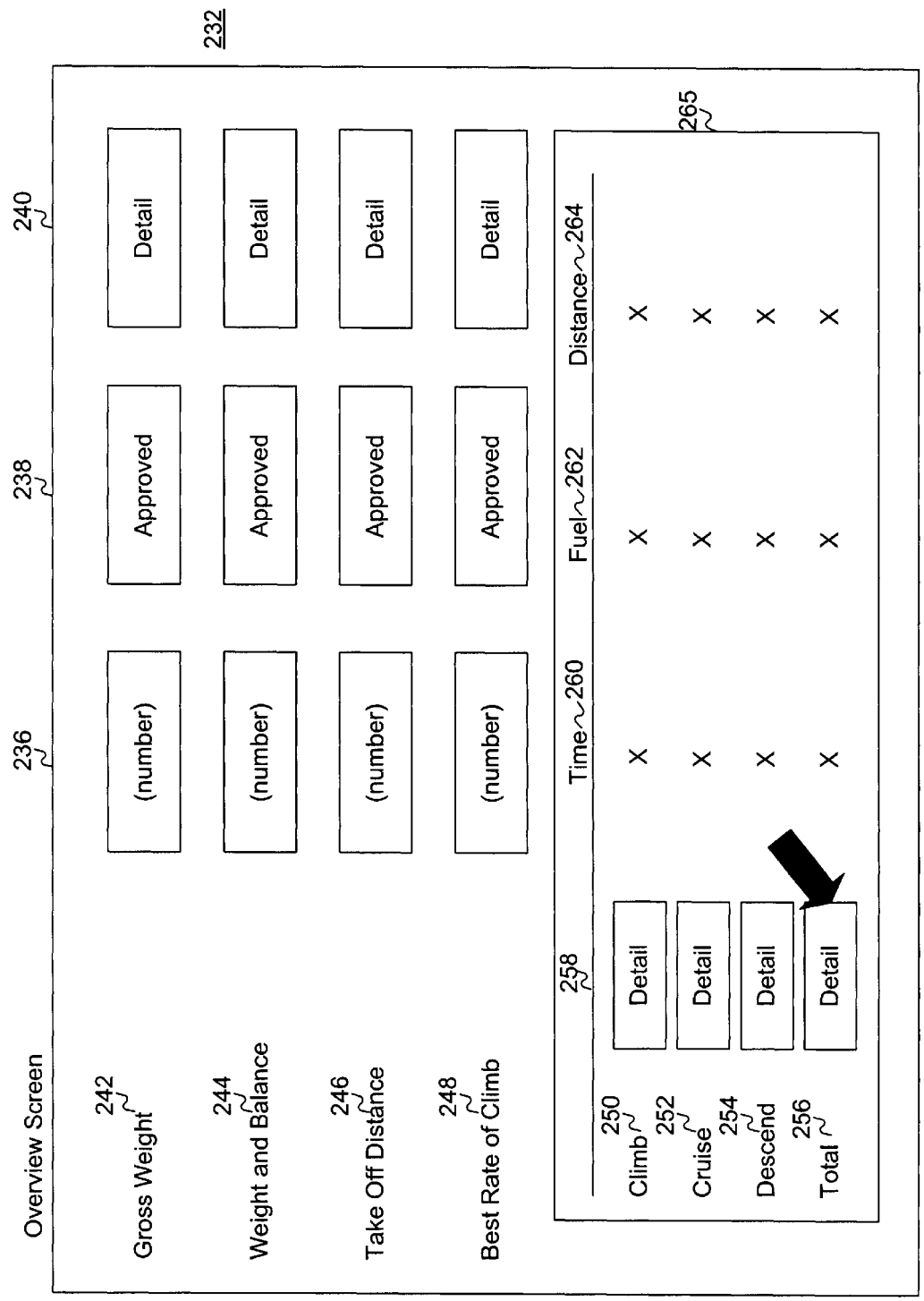
FIG. 23 shows a more detailed depiction of an overview screen of FIG. 22.

FIG. 23 shows a more detailed depiction of an overview screen. In particular, overview screen 232 is comprised of a numeric indicator column 236, an approved indicator column 238, a detail selector column 240, a gross weight row 242, a weight and balance row 244, a take-off distance row 246, a best rate-of-climb row 248, and a dynamics summary portion 265.

Overview screen 232 allows pilot 12 to quickly scan the flight preparation information without having to refer to specific details. In one embodiment, overview screen displays information relating to gross weight, weight and balance, take-off distance, best rate-of-climb and dynamics. However, any information which may aid in flight preparation and/or aircraft safety is consistent with the principles of the present invention.

Numeric indicator column 236 displays the calculated value for the corresponding row. Numerical values may be displayed in various colors to aid in interpreting the values. For example, numerical values may be displayed in red and green to indicate values representing unsafe versus safe aircraft operation. In one embodiment, numeric indicator column displays 236 uses at least red and green colors to display values. However, any way of aiding in the display of numbers, e.g., bold and/or flashing is consistent with the principles of the present invention.

Approval indicator column 238 displays whether numeric values are approved for safe flight. Approval may be displayed in various colors to aid in interpreting the values. For example, approval may be displayed in red and green to indicate values which indicate approved versus unapproved values. In one embodiment, approval indicator column 236 uses at least red and green colors to display values. However, any way of aiding in the display of numbers, e.g., bold and/or flashing is consistent with the principles of the present invention.

Detail selector column 240 allows pilot 12 to obtain detailed information. For example, a pilot may position a cursor, push a button, or push on the screen itself. Upon selecting a detail selector button, detailed information on a desired parameter may be pulled up and displayed on a detail screen.

Dynamics summary portion 265 provides a summary of dynamics information. In one embodiment, the dynamics summary portion 265 displays time, fuel and distance information for climb, cruise, descend, and totals. However, any dynamics information which aids in flight preparation and/or flight safety is consistent with the principles of the present invention.

Dynamics summary portion 265 also displays detail selector column 258 which allows the pilot 12 to obtain detail information concerning a particular dynamic, e.g. climb, cruise, descend, or total.

Figure 24:
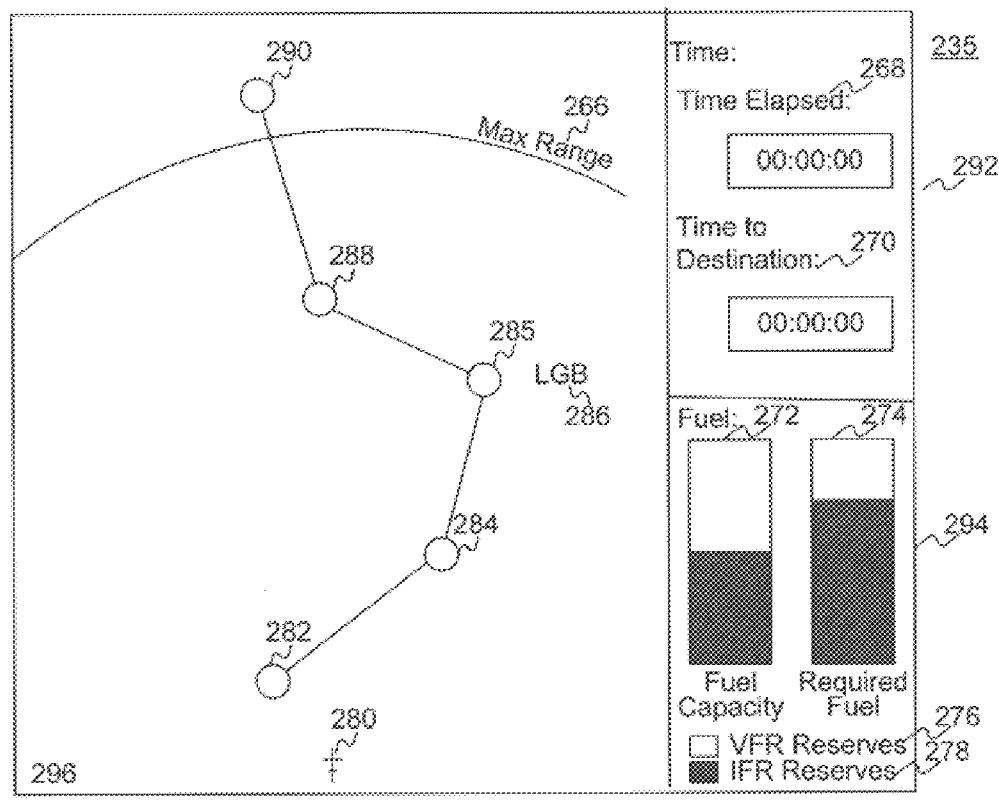
FIG. 24 shows a more detailed depiction of a dynamics detail screen of FIG. 22.

FIG. 24 shows a more detailed depiction of a dynamics detail screen within the detail screen level, consistent with principles of the present invention. In particular, as shown in FIG. 24, dynamics detail screen 235 is within detail screens level 234. For example, dynamics detail screen 235 may be comprised of a flight plan map portion 296, a time indicator portion 292, and a fuel indicator portion 294.

In FIG. 24, a map (or a moving map) is shown. In a map section 296, aircraft 10 is represented by an icon 280 and its present routing with a maximum range arc 266. Points 282, 284, 285, 288, and 290 and airport code 286, e.g., LGB, illustrate various points of the current flight plan entered by pilot 12.

Fuel section 294 illustrates the fuel required to reach destination 290. Either visual flight rules (VFR) reserve 276 or instrument flight rules (IFR) reserve 278 may be used.

In time section 292, area 268 shows time since flight take-off and area 270 shows time to destination or estimated time to reach destination. Automated flight preparation system 14 may update the fuel quantity that is available in the aircraft and based on that, continuously update maximum range arc 266 to the pilot about the maximum range that could be obtained with that fuel and power setting.

For example, the maximum range for a power setting of 55% power will be greater than the maximum range for a power setting of 65% power, and greater yet than for 75% power. For this reason, multiple maximum range arcs may be displayed each with the power setting noted. In the event that aircraft 10 cannot reach its destination with the present amount of amount of fuel, the system will give a visual warning of "insufficient" fuel (e.g., a flashing warning). A verbal warning may also be provided. In one embodiment, automated flight preparation system 14 may aid in determining an alternate destination for pilot 12. For example, using the maximum range are 266 in FIG. 24, the pilot may be redirected to airport LGB at point 286, which appears within the fuel range.

In section 294, fuel capacity is depicted in green. In one embodiment, fuel capacity green is green on white, where green is actual fuel capacity, and white is the maximum fuel capacity. Other colors and/or displays may also be used consistent with the principles of the present invention. Actual fuel capacity is shown in area 272, using green on white. In addition, area 274 shows required fuel to destination, also using green on white. Thus, a pilot 12 can easily determine an alternate flight plan in the event of a fuel shortage. Although only alternate planning for a fuel shortage is described, other alternative planning aids are consistent with the principles of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of determining a rate-of-climb for an aircraft, comprising:

determining automatically a gross weight for the aircraft;

receiving a set of data indicating a rate-of-climb for the aircraft;

receiving information indicating conditions affecting the rate-of-climb for the aircraft;

determining automatically a rate-of-climb for the aircraft based on the gross weight, conditions affecting the rate-of-climb, and the set of data indicating the rate-of-climb; and providing the rate-of-climb for the aircraft.

2. The method of claim 1, wherein receiving information indicating conditions affecting the rate-of-climb for the aircraft comprises receiving a measurement of outside air temperature.

3. The method of claim 1, wherein receiving information indicating conditions affecting the rate-of-climb for the aircraft comprises receiving information indicating an air pressure.

4. The method of claim 1, wherein determining a rate-of-climb for the aircraft comprises determining a best rate-of-climb.

5. A method of determining flight dynamics information, comprising:
   determining automatically a gross weight for the aircraft;
   receiving at least one set of flight dynamics data for the aircraft;
   receiving information indicating conditions affecting the flight dynamics of the aircraft; and
   determining automatically at least one flight dynamics parameter for the aircraft based on the gross weight, conditions affecting the flight dynamics, and the set of flight dynamics data.

6. The method of claim 5, wherein receiving information indicating conditions affecting the flight dynamics of the aircraft comprises receiving a measurement of outside air temperature.

7. The method of claim 5, wherein receiving information indicating conditions affecting the flight dynamics of the aircraft comprises receiving information indicating an air pressure.

8. The method of claim 5, wherein receiving at least one set of flight dynamics data comprises:
   receiving a first set of flight dynamics data at a first weight;
   receiving a second set of flight dynamics data at a second weight; and
   calculating a third set of flight dynamics data based on interpolating between the first and second set of flight dynamics data.

9. The method of claim 5, wherein determining automatically at least one flight dynamics parameter comprises determining at least one of time, fuel, and distance to change altitude.

10. A flight preparation method, comprising:
    determining automatically a gross weight for an aircraft;
    determining automatically a balance for the aircraft based on the gross weight;
    determining automatically a takeoff distance for the aircraft based on the gross weight;
    determining automatically a best rate of climb for the aircraft based on the gross weight; and
    determining automatically a fuel, a time, and a distance to change to an altitude.

11. The flight preparation method of claim 10, further comprising:
    determining automatically a fuel, a time, and a distance to cruise.

12. An apparatus for determining a rate of climb for an aircraft, comprising:
    means for determining automatically a gross weight for the aircraft;
    means for receiving a set of data indicating a rate-of-climb for the aircraft;
    means for receiving information indicating conditions affecting the rate-of-climb for the aircraft; and
    means for determining automatically a rate-of-climb for the aircraft based on the gross weight, conditions affecting the rate-of-climb, and the set of data indicating the rate-of-climb.

13. An apparatus for determining flight dynamics information, comprising:
    means for determining automatically a gross weight for the aircraft;
    means for receiving at least one set of flight dynamics data for the aircraft;
    means for receiving information indicating conditions affecting the flight dynamics of the aircraft; and
    means for determining automatically at least one flight dynamics information for the aircraft based on the gross weight, conditions affecting the flight dynamics, and the set of flight dynamics data.

14. A system for automated flight preparation, comprising:
    a first module to determine automatically a gross weight for an aircraft;
    a second module to determine automatically a balance for the aircraft;
    a third module to determine automatically a take-off distance for the aircraft;
    a fourth module to determine a rate of climb for the aircraft; and
    a fifth module to determine at least one dynamics information for the aircraft.

15. The system of claim 14, further comprising:
    an interface to provide information from at least one of the first, second, third, fourth, and fifth modules.

* * * * *